US012662106B2

(12) United States Patent
Kim et al.

(10) Patent No.: US 12,662,106 B2
(45) Date of Patent: *Jun. 23, 2026

(54) VEHICLE MOTION CONTROL USING TORQUE VECTORING WITH CONSIDERATION OF DRIVER INTENT AND LOAD TRANSFER

(71) Applicant: Canoo Technologies Inc., Torrance, CA (US)

(72) Inventors: Kilsoo Kim, Redondo Beach, CA (US); Paolo E. Pucci, Warwick (GB)

(73) Assignee: WHS ENERGY SOLUTIONS, LLC, Argyle, TX (US)

( * ) Notice: Subject to any disclaimer, the term of this patent is extended or adjusted under 35 U.S.C. 154(b) by 281 days.

This patent is subject to a terminal disclaimer.

(21) Appl. No.: 17/935,632

(22) Filed: Sep. 27, 2022

(65) Prior Publication Data

US 2023/0174040 A1      Jun. 8, 2023

Related U.S. Application Data

(60) Provisional application No. 63/287,349, filed on Dec. 8, 2021.

(51) Int. Cl.
B60W 10/16         (2012.01)
B60W 40/114        (2012.01)
(Continued)

(52) U.S. Cl.
CPC .......... B60W 10/16 (2013.01); B60W 40/114 (2013.01); B60W 40/13 (2013.01);
(Continued)

(58) Field of Classification Search
CPC .... B60W 10/16; B60W 40/114; B60W 40/13; B60W 50/10; B60W 2040/1307;
(Continued)

(56) References Cited

U.S. PATENT DOCUMENTS

| 5,711,024 A | 1/1998 | Wanke |
| 8,527,172 B2 | 9/2013 | Moshchuk et al. |

(Continued)

FOREIGN PATENT DOCUMENTS

| CN | 113273016 A | 8/2021 |
| DE | 102006059989 A1 | 6/2008 |

(Continued)

OTHER PUBLICATIONS

Notice of Allowance dated Jun. 22, 2023 in connection with U.S. Appl. No. 17/449,426, 8 pages.

(Continued)

*Primary Examiner* — Sihar A Karwan
(74) *Attorney, Agent, or Firm* — ALLEN, DYER, DOPPELT, + GILCHRIST, P.A. Attorneys at Law

(57) ABSTRACT

A method includes identifying an actual path and a desired path for a vehicle, where the actual path represents an expected path for the vehicle based on current operation of the vehicle and the desired path represents an estimated path that a driver of the vehicle wants to follow. The method also includes identifying one or more errors between the actual path and the desired path. The method further includes determining how to apply torque vectoring to cause the vehicle to more closely follow the desired path based on the one or more errors. In addition, the method includes applying the torque vectoring to create lateral movement of the vehicle during travel.

21 Claims, 9 Drawing Sheets

(51) Int. Cl.
*B60W 40/13* (2012.01)
*B60W 50/10* (2012.01)

(52) U.S. Cl.
CPC ..... *B60W 50/10* (2013.01); *B60W 2040/1307*
(2013.01); *B60W 2520/14* (2013.01); *B60W*
*2720/30* (2013.01)

(58) Field of Classification Search
CPC ........ B60W 2520/14; B60W 2720/30; B60W
2050/0033; B60W 2520/10; B60W
2540/18; B60W 2720/40; B60W 30/045;
B60W 30/18145
See application file for complete search history.

(56) References Cited

U.S. PATENT DOCUMENTS

| | | | |
|---|---|---|---|
| 8,647,763 | B2 | 2/2014 | Tennessen et al. |
| 8,825,335 | B2 | 9/2014 | Rylander |
| 8,989,981 | B2 | 3/2015 | Yamakado et al. |
| 9,278,713 | B2 | 3/2016 | Moshchuk et al. |
| 9,487,139 | B1 | 11/2016 | Ishida et al. |
| 9,701,307 | B1 | 7/2017 | Newman et al. |
| 9,912,023 | B1 | 3/2018 | Mastrandrea et al. |
| 10,442,310 | B1 * | 10/2019 | Drako .................. B60K 17/145 |
| 10,829,153 | B1 | 11/2020 | Taniguchi |
| 2004/0128042 | A1 | 7/2004 | Takahashi et al. |
| 2004/0176899 | A1 | 9/2004 | Hallowell |
| 2004/0262991 | A1 | 12/2004 | Anwar |
| 2006/0086556 | A1 | 4/2006 | Matsuno |
| 2008/0299448 | A1 | 12/2008 | Buck et al. |
| 2010/0104938 | A1 | 4/2010 | Hermann |
| 2010/0212338 | A1 | 8/2010 | Hermann et al. |
| 2011/0293998 | A1 | 12/2011 | Sato et al. |
| 2012/0107663 | A1 | 5/2012 | Burgers et al. |
| 2013/0004820 | A1 | 1/2013 | Tennessen et al. |
| 2014/0222309 | A1 | 8/2014 | Yamakado et al. |
| 2016/0118700 | A1 | 4/2016 | Perumalla et al. |
| 2017/0005377 | A1 | 1/2017 | Rong |
| 2017/0092999 | A1 | 3/2017 | Tarlau et al. |
| 2017/0137023 | A1 * | 5/2017 | Anderson .......... B60G 17/0195 |
| 2017/0279172 | A1 | 9/2017 | Tucker |
| 2017/0301964 | A1 | 10/2017 | Murakami et al. |
| 2017/0352931 | A1 | 12/2017 | Yoshida et al. |
| 2017/0358833 | A1 | 12/2017 | Jalilevand et al. |
| 2018/0145382 | A1 | 5/2018 | Harris et al. |
| 2018/0297594 | A1 | 10/2018 | Takahashi et al. |
| 2018/0359877 | A1 | 12/2018 | Wang et al. |
| 2019/0176801 | A1 | 6/2019 | Ruybal et al. |
| 2019/0276039 | A1 | 9/2019 | Kambe et al. |
| 2020/0079391 | A1 | 3/2020 | Jonasson et al. |
| 2020/0216085 | A1 | 7/2020 | Bobier-Tiu et al. |
| 2020/0220132 | A1 | 7/2020 | Bourke et al. |
| 2020/0290668 | A1 | 9/2020 | Moreillon et al. |
| 2021/0139016 | A1 | 5/2021 | Horiguchi et al. |
| 2021/0323551 | A1 | 10/2021 | Kvieska et al. |
| 2022/0144249 | A1 | 5/2022 | Do et al. |
| 2022/0396259 | A1 | 12/2022 | Balachandran et al. |
| 2023/0022906 | A1 | 1/2023 | Balachandran et al. |
| 2023/0026238 | A1 | 1/2023 | Arima et al. |
| 2023/0105572 | A1 | 4/2023 | Asadi et al. |

FOREIGN PATENT DOCUMENTS

| | | | |
|---|---|---|---|
| RU | 2339125 | C1 | 11/2008 |
| WO | 2020146419 | A1 | 7/2020 |

OTHER PUBLICATIONS

Non-Final Office Action dated Jun. 27, 2023 in connection with U.S. Appl. No. 17/449,413, 9 pages.

Feng et al., "Estimation of Lead Vehicle Kinematics Using Camera-Based Data for Driver Distraction Detection," International Journal of Automotive Engineering, vol. 9, No. 3, 2018, 7 pages.

Guo et al., "Coordinated path-following and direct yaw-moment control of autonomous electric vehicles with sideslip angle estimation," Mechanical Systems and Signal Processing, Dec. 2017, 17 pages.

Mangia et al., "An integrated torque-vectoring control framework for electric vehicles featuring multiple handling and energy efficiency models selectable by the driver," Meccanica, Mar. 2021, 20 pages.

Wang et al., "Map-Enhanced Ego-Lane Detection in the Missing Feature Scenarios," arXiv:2004.01101v1 [cs.CV], Apr. 2020, 10 pages.

Kim et al., "Autonomous Lateral Control of Vehicle Using Direct Yaw Moment Control," U.S. Appl. No. 17/449,413, filed Sep. 29, 2021, 49 pages.

Kim et al., "Path Tracking Control for Self-Driving of Vehicle with Yaw Moment Distribution," U.S. Appl. No. 17/449,419, filed Sep. 29, 2021, 49 pages.

Kim et al., "Emergency Motion Control for Vehicle Using Steering and Torque Vectoring," U.S. Appl. No. 17/449,426, filed Sep. 29, 2021, 38 pages.

Non-Final Office Action dated Mar. 25, 2020 in connection with U.S. Appl. No. 16/736,698, 19 pages.

Notice of Allowance dated Aug. 24, 2020 in connection with U.S. Appl. No. 16/736,698, 11 pages.

Supplemental Notice of Allowability dated Dec. 2, 2020 in connection with U.S. Appl. No. 16/736,698, 3 pages.

International Search Report and Written Opinion of the International Searching Authority dated Apr. 16, 2020 in connection with International Patent Application No. PCT/US2020/012619, 7 pages.

International Preliminary Report on Patentability dated Jun. 16, 2021 in connection with International Patent Application No. PCT/US2020/012619, 6 pages.

International Search Report and Written Opinion of the International Searching Authority dated Dec. 5, 2022 in connection with International Patent Application No. PCT/US2022/076959, 11 pages.

International Search Report and Written Opinion of the International Searching Authority dated Nov. 23, 2022 in connection with International Patent Application No. PCT/US2022/076958, 9 pages.

Non-Final Office Action dated Mar. 15, 2023 in connection with U.S. Appl. No. 17/449,426, 18 pages.

Non-Final Office Action dated Apr. 21, 2023 in connection with U.S. Appl. No. 17/449,413, 12 pages.

Non-Final Office Action dated Jun. 6, 2023 in connection with U.S. Appl. No. 17/449,419, 18 pages.

Final Office Action dated Sep. 6, 2023 in connection with U.S. Appl. No. 17/449,413, 10 pages.

Notice of Allowance dated Sep. 20, 2023 in connection with U.S. Appl. No. 17/449,419, 14 pages.

Non-final Office Action dated Apr. 15, 2024, in connection with U.S. Appl. No. 18/470,906, 21 pages.

International Search Report and Written Opinion of the International Searching Authority dated Dec. 28, 2022, in connection with International Patent Application No. PCT/US2022/077057, 11 pages.

Non-final Office Action dated Oct. 29, 2024, in connection with U.S. Appl. No. 18/470,906, 24 pages.

* cited by examiner

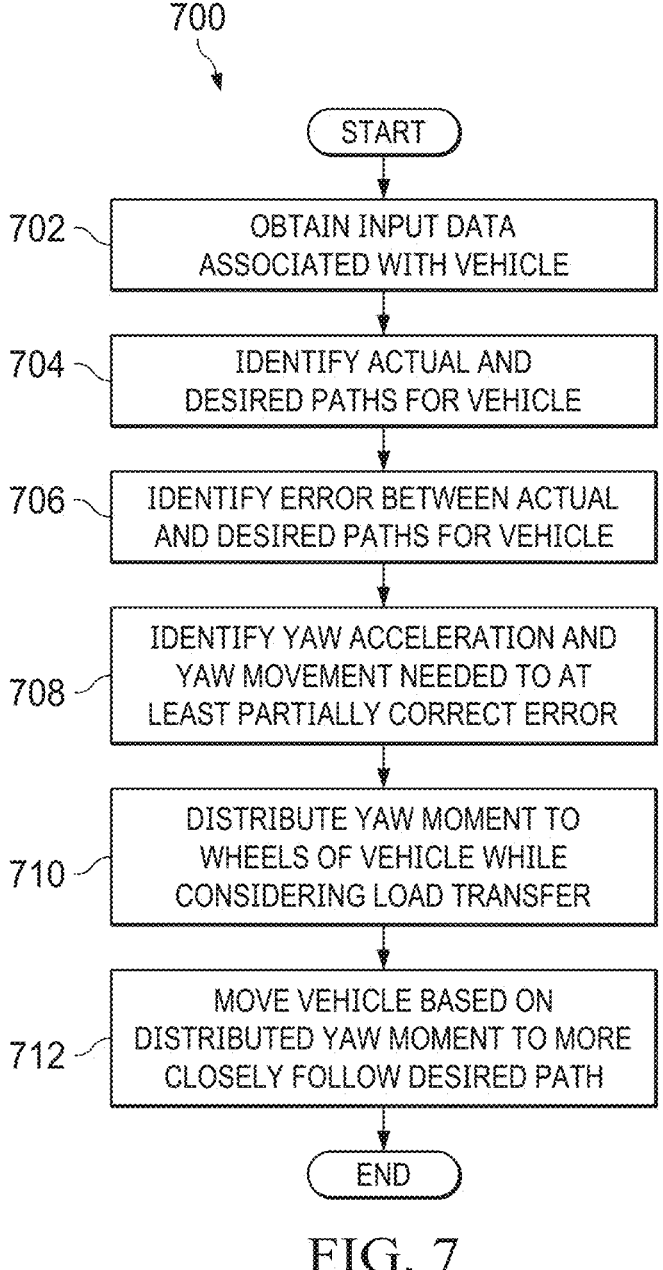

700

START

702 — OBTAIN INPUT DATA ASSOCIATED WITH VEHICLE

704 — IDENTIFY ACTUAL AND DESIRED PATHS FOR VEHICLE

706 — IDENTIFY ERROR BETWEEN ACTUAL AND DESIRED PATHS FOR VEHICLE

708 — IDENTIFY YAW ACCELERATION AND YAW MOVEMENT NEEDED TO AT LEAST PARTIALLY CORRECT ERROR

710 — DISTRIBUTE YAW MOMENT TO WHEELS OF VEHICLE WHILE CONSIDERING LOAD TRANSFER

712 — MOVE VEHICLE BASED ON DISTRIBUTED YAW MOMENT TO MORE CLOSELY FOLLOW DESIRED PATH

END

802 — FUNCTIONAL DESIGN

804 — SPICE SIMULATION

806 — PHYSICAL DESIGN

808 — PHYSICAL VERIFICATION

810 — TAPEOUT

812

900

STORAGE DEVICES

PROCESSING DEVICE
902

MEMORY 910    912

PERSISTENT STORAGE

904

COMMUNICATIONS UNIT
906

INPUT/OUTPUT UNIT
908

VEHICLE MOTION CONTROL USING TORQUE VECTORING WITH CONSIDERATION OF DRIVER INTENT AND LOAD TRANSFER

CROSS-REFERENCE TO RELATED APPLICATION AND PRIORITY CLAIM

This application claims priority under 35 U.S.C. § 119(e) to U.S. Provisional Patent Application No. 63/287,349 filed on Dec. 8, 2021. This provisional application is hereby incorporated by reference in its entirety.

TECHNICAL FIELD

This disclosure relates generally to vehicle control systems. More specifically, this disclosure relates to vehicle motion control using torque vectoring with consideration of driver intent and load transfer.

BACKGROUND

Advanced driving assist system (ADAS) features use automated technology to assist a vehicle's operator in driving and parking and form a foundation for autonomous driving (AD). Lateral control of an ego vehicle's position within a traffic lane is one example of an ADAS or AD feature that can be implemented for the ego vehicle, where the ego vehicle refers to the vehicle on which one or more sensors used for ADAS, AD, or other features are mounted. For example, lateral control may be used to help keep an ego vehicle at or near the center of a traffic lane during travel within the traffic lane (referred to as "lane centering"), to help keep an ego vehicle within a traffic lane during travel (referred to as "lane keeping"), or to cause an ego vehicle to move from one traffic lane to another traffic lane (referred to as "lane changing"). Lateral control may also be used to control an ego vehicle in order to avoid a potential impact, such as by applying emergency braking or evasive steering in order to avoid another vehicle or other object within the traffic lane of the ego vehicle.

SUMMARY

This disclosure relates to vehicle motion control using torque vectoring with consideration of driver intent and load transfer.

In a first embodiment, a method includes identifying an actual path and a desired path for a vehicle, where the actual path represents an expected path for the vehicle based on current operation of the vehicle and the desired path represents an estimated path that a driver of the vehicle wants to follow. The method also includes identifying one or more errors between the actual path and the desired path. The method further includes determining how to apply torque vectoring to cause the vehicle to more closely follow the desired path based on the one or more errors. In addition, the method includes applying the torque vectoring to create lateral movement of the vehicle during travel.

In a second embodiment, an apparatus includes at least one processing device configured to identify an actual path and a desired path for a vehicle, where the actual path represents an expected path for the vehicle based on current operation of the vehicle and the desired path represents an estimated path that a driver of the vehicle wants to follow. The at least one processing device is also configured to identify one or more errors between the actual path and the desired path, determine how to apply torque vectoring to cause the vehicle to more closely follow the desired path based on the one or more errors, and apply the torque vectoring to create lateral movement of the vehicle during travel.

In a third embodiment, a non-transitory machine-readable medium contains instructions that when executed cause at least one processor to identify an actual path and a desired path for a vehicle, where the actual path represents an expected path for the vehicle based on current operation of the vehicle and the desired path represents an estimated path that a driver of the vehicle wants to follow. The medium also contains instructions that when executed cause the at least one processor to identify one or more errors between the actual path and the desired path, determine how to apply torque vectoring to cause the vehicle to more closely follow the desired path based on the one or more errors, and apply the torque vectoring to create lateral movement of the vehicle during travel.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts:

FIG. 7 illustrates an example method for vehicle motion control using torque vectoring with consideration of driver intent and load transfer according to this disclosure;

DETAILED DESCRIPTION

Figure 1:
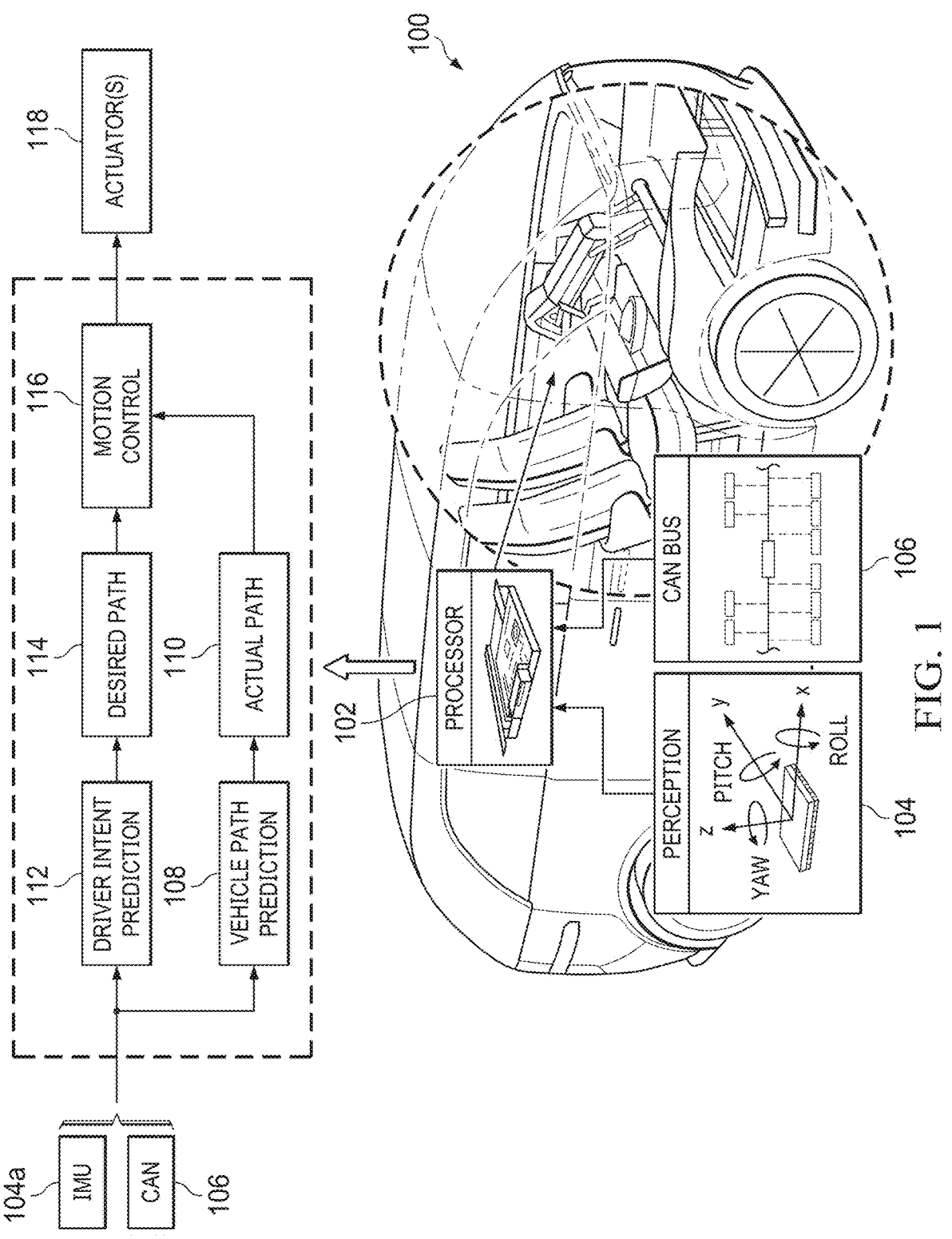
FIG. 1 illustrates an example vehicle supporting vehicle motion control using torque vectoring with consideration of driver intent and load transfer according to this disclosure.

FIGS. 1 through 9, described below, and the various embodiments used to describe the principles of this disclosure are by way of illustration only and should not be construed in any way to limit the scope of this disclosure. Those skilled in the art will understand that the principles of this disclosure may be implemented in any type of suitably arranged device or system.

As noted above, advanced driving assist system (ADAS) features use automated technology to assist a vehicle's operator in driving and parking and form a foundation for autonomous driving (AD). Lateral control of an ego vehicle's position within a traffic lane is one example of an ADAS or AD feature that can be implemented for the ego vehicle, where the ego vehicle refers to the vehicle on which one or more sensors used for ADAS, AD, or other features are mounted. For example, lateral control may be used to help keep an ego vehicle at or near the center of a traffic lane during travel within the traffic lane (referred to as "lane centering"), to help keep an ego vehicle within a traffic lane during travel (referred to as "lane keeping"), or to cause an ego vehicle to move from one traffic lane to another traffic lane (referred to as "lane changing"). Lateral control may also be used to control an ego vehicle in order to avoid a potential impact, such as by applying emergency braking or evasive steering in order to avoid another vehicle or other object within the traffic lane of the ego vehicle.

In a vehicle with a conventional internal combustion engine, a drivetrain of the vehicle is used to distribute power from the engine to the wheels of the vehicle, and the drivetrain typically includes a differential gear train that helps to distribute the power to left and right wheels of the vehicle while allowing those wheels to turn at different rates. In electric vehicles, the configuration of the powertrain is far more flexible since electric vehicles may include various numbers of motor configurations. Example motor configurations can include one motor in front, one motor in back, multiple motors in front, multiple motors in back, or any suitable combination thereof. In some cases, each individual wheel of an electric vehicle can have its own independent powertrain. Among other things, these various motor configurations permit different ways of providing "torque vectoring," which refers to the ability to cause a vehicle to move laterally (left or right) by controlling the torques applied to different wheels of the vehicle (rather than turning the vehicle's steering wheel). Torque vectoring is performed by applying different torques to left and right wheels of a vehicle, which causes the vehicle to move laterally in the direction of the wheel having the lower torque. These vehicles still support "steering control," which allows a vehicle operator to control the steering of the vehicle's wheels using a steering wheel.

This disclosure provides techniques for performing vehicle motion control using torque vectoring with consideration of driver intent and load transfer. As described in more detail below, a predicted vehicle path for an ego vehicle can be determined, where the predicted vehicle path identifies the actual path that the vehicle is expected to follow. The predicted vehicle path may be determined using any suitable information, such as the current traveling direction and other information captured at the ego vehicle. A driver's desired path for the ego vehicle can also be determined, where the driver's desired path identifies the estimated path that the driver wants the vehicle to follow. The driver's desired path may be determined using any suitable information, such as the driver's input through the vehicle's steering wheel. The two paths can be compared to identify an error between the paths, and the error can be used to identify how torque vectoring can be applied to at least partially achieve the driver's desired path for the ego vehicle. Moreover, normal tire forces applied by tires of the ego vehicle can be considered when determining how to apply the torque vectoring. This may include, for instance, estimating how longitudinal and lateral loads would be distributed to the tires of the ego vehicle if the driver's desired path for the ego vehicle is followed and ensuring that minimum and maximum normal tire forces are maintained on all tires of the ego vehicle during a maneuver.

ADAS systems often do not consider both driver intent and load transfer when making steering adjustments to vehicles. For example, a driver may wish to perform faster or sharper maneuvers than an ADAS system would typically perform, and torque vectoring can often be used to provide faster vehicle responses. By considering both the driver's intent and the load transfer when maneuvering a vehicle, an ADAS system or other system of a vehicle can provide a more enjoyable driving experience for the driver while still ensuring safe and reliable operation of the vehicle.

FIG. 1 illustrates an example vehicle 100 supporting vehicle motion control using torque vectoring with consideration of driver intent and load transfer according to this disclosure. In this particular example, the vehicle 100 takes the form of an automotive passenger vehicle, such as an electric vehicle. However, any other suitable vehicle may support torque vectoring with consideration of driver intent and load transfer, such as other types of electric vehicles having different forms or other types of vehicles.

As shown in FIG. 1, the vehicle 100 includes at least one processor 102 configured to control one or more operations of the vehicle 100. In this example, the processor 102 may interact with one or more sensors 104 and with one or more components coupled to a bus 106. In this particular example, the one or more sensors 104 include at least one inertial measurement unit (IMU) 104a, and the bus 106 represents a controller area network (CAN) bus. However, the processor 102 may interact with any other or additional sensor(s) and communicate over any other or additional bus(es). For instance, other or additional types of sensors 104 that may be used here can include one or more visible, infrared, or other cameras, radio detection and ranging (RADAR) sensors, light detection and ranging (LIDAR) sensors, or other types of sensors. In general, any suitable type(s) of sensor(s) 104 may be used to collect information for processing by the vehicle 100, and this disclosure is not limited to any specific type(s) of sensor(s) 104.

Measurements and/or other data from the sensors 104 and steering information and/or other information from one or more components coupled to the bus 106 are used by the processor 102 or other component(s) as described below to control the path traveled by the vehicle 100, such as to identify the estimated path of the vehicle and to control the movements of the vehicle 100 based on driver intent and load transfer. For example, the processor 102 can process information in order to perceive lane-marking lines or other markings on a road, floor, or other surface. The processor 102 can also process information to generate predictions associated with the vehicle 100, such as to predict the future path of the vehicle 100 based on current driving information and to predict the driver's desired path for the vehicle 100. As described below, the processor 102 can use the predicted path of the vehicle 100 and the driver's desired path for the vehicle 100 to perform torque vectoring control in order to create lateral movement or other movement of the vehicle 100. Also, the processor 102 can consider load transfer on the tires of the vehicle 100 in order to implement the torque vectoring control safely and effectively.

In this example, the processor 102 performs a vehicle path prediction function 108, which generally involves estimating the path to be followed by the vehicle 100 during travel based on the current behavior of the vehicle 100. For example, the vehicle path prediction function 108 can use inputs from the IMU(s) 104a or other sensor information and/or information received over the bus 106 to identify an estimated path that will be followed by the vehicle 100 based on the vehicle's current steering direction, speed, torque vectoring (if any), and acceleration or braking (if any). This path may represent a path being followed in order to keep the vehicle 100 within or centered in a current traffic lane or to move the vehicle 100 from one traffic lane to another traffic lane while avoiding other objects (like other vehicles). The vehicle path prediction function 108 can use any suitable technique to predict the actual path to be followed by the vehicle 100, such as by using a curve fitting or filtering algorithm to estimate the path of the vehicle 100. Example operations of the vehicle path prediction function 108 are described in more detail below. The vehicle path prediction function 108 outputs an actual path 110 that is likely to be followed by the vehicle 100 based on current information. In some cases, the actual path 110 may be expressed as a multi-order polynomial that identifies the predicted path for the vehicle 100.

The processor 102 also performs a driver intent prediction function 112, which generally involves estimating the path that the driver wants the vehicle 100 to follow during travel. For example, the driver intent prediction function 112 can use inputs from the IMU(s) 104a or other sensor information and/or information received over the bus 106, such as the driver's current steering wheel position or acceleration/braking inputs, to identify an estimated path that the driver of the vehicle 100 appears to want the vehicle 100 to follow. This path may represent a path that would not keep the vehicle 100 within or centered in a current traffic lane or that would cause the vehicle 100 to perform a lane change or other maneuvers more rapidly than the vehicle 100 would ordinarily perform. The driver intent prediction function 112 can use any suitable technique to predict the driver's desired path to be followed by the vehicle 100. Example operations of the driver intent prediction function 112 are described in more detail below. The driver intent prediction function 112 outputs a desired path 114 that identifies the estimated path that the driver would like the vehicle 100 to follow. In some cases, the desired path 114 may be expressed as a multi-order polynomial that identifies the desired path for the vehicle 100.

The actual path 110 and the desired path 114 (and possibly other information) may be provided to a motion control function 116, which generally uses this information to determine how to adjust the operation of the vehicle 100 so that the vehicle 100 can adjust its path to at least partially follow the driver's desired path (if possible). For example, the motion control function 116 may determine one or more differences between the actual path 110 and the desired path 114. The motion control function 116 may use the one or more differences to determine whether it is possible to safely change the travel direction of the vehicle 100 in order to align or more closely align with the desired path 114 rather than with the actual path 110. The motion control function 116 may further determine how to adjust operation of the vehicle 100 in order to try and follow the desired path 114, such as by determining how to apply torque vectoring to the vehicle 100 in order to create path changes. In some cases, the motion control function 116 can estimate the load transfer onto the tires of the vehicle 100 when implementing the torque vectoring to help ensure safe operation of the vehicle 100. Example operations of the motion control function 116 are described in more detail below.

In order to actually implement path changes to the vehicle 100, the motion control function 116 can be used to adjust or control the operation of one or more actuators 118 in the vehicle 100. In some cases, the one or more actuators 118 may represent one or more electric motors, brakes, or regenerative braking systems that can be used to implement torque vectoring control of the vehicle 100. Example techniques for performing torque vectoring are described below. Note, however, that the specific ways in which the operations of the vehicle 100 can vary depend on the specific vehicle 100 being used.

The functions 108, 112, 116 shown in FIG. 1 and described above may be implemented in any suitable manner in the vehicle 100. For example, in some embodiments, various functions 108, 112, 116 may be implemented or supported using one or more software applications or other software instructions that are executed by at least one processor 102. In other embodiments, at least some of the functions 108, 112, 116 can be implemented or supported using dedicated hardware components. In general, the functions 108, 112, 116 described above may be performed using any suitable hardware or any suitable combination of hardware and software/firmware instructions.

The processor 102 itself may also be implemented in any suitable manner, and the vehicle 100 may include any suitable number(s) and type(s) of processors or other processing devices in any suitable arrangement. Example types of processors 102 that may be used here include one or more microprocessors, microcontrollers, digital signal processors (DSPs), application specific integrated circuits (ASICs), field programmable gate arrays (FPGAs), or discrete circuitry. Each processor 102 may also have any suitable number of processing cores or engines. In some cases, multiple processors 102 or multiple processing cores or engines in one or more processors 102 may be used to perform the functions 108, 112, 116 described above. This may allow, for instance, the processor(s) 102 to be used to process information and perform common tasks or different tasks in parallel.

Although FIG. 1 illustrates one example of a vehicle 100 supporting vehicle motion control using torque vectoring with consideration of driver intent and load transfer, various changes may be made to FIG. 1. For example, various functions and components shown in FIG. 1 may be combined, further subdivided, replicated, omitted, or rearranged and additional functions and components may be added according to particular needs. Also, as noted above, the functionality for vehicle motion control using torque vectoring with consideration of driver intent and load transfer may be used with any other suitable vehicle.

Figure 2A:
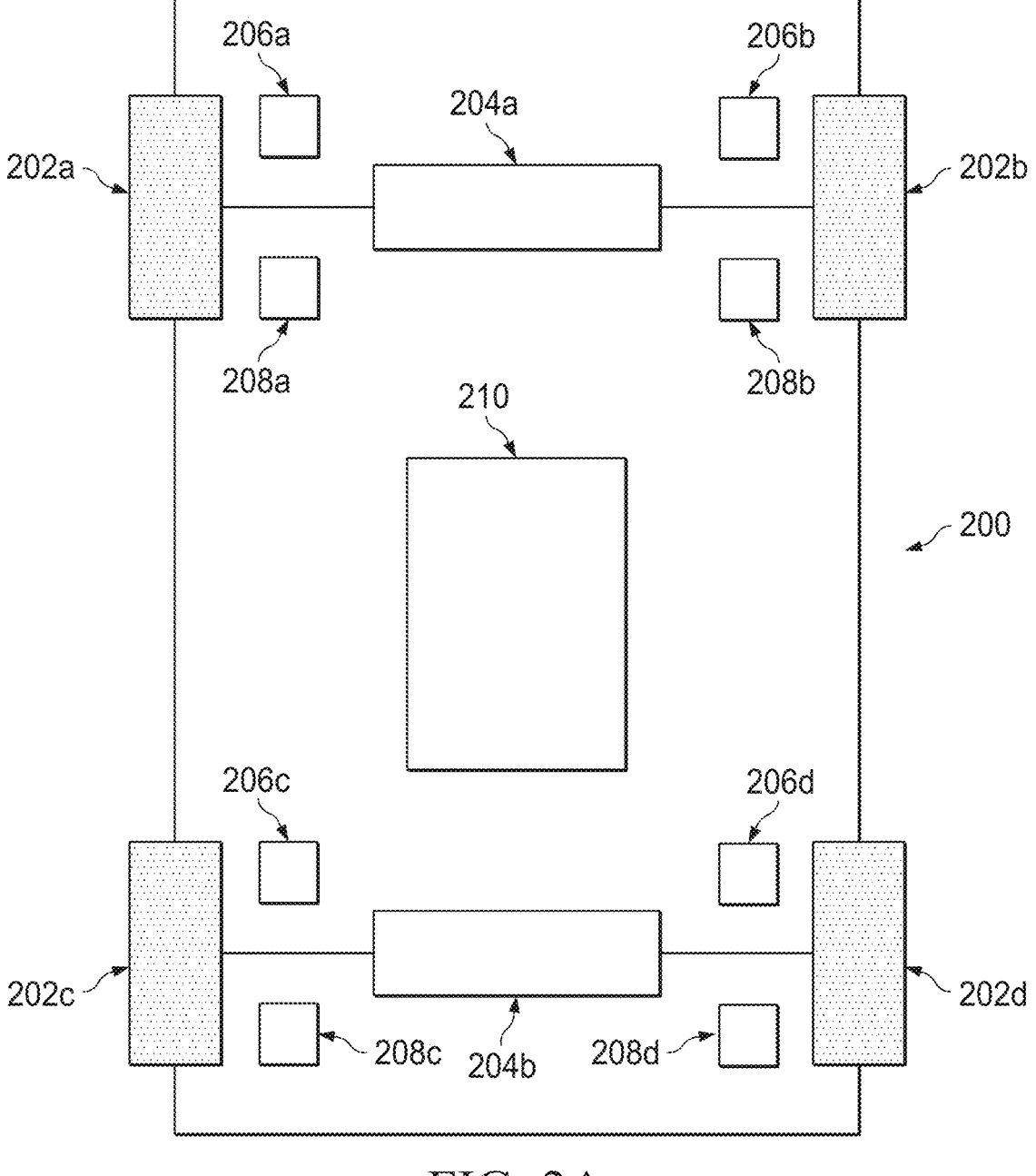
FIGS. 2A and 2B illustrate example arrangements of components in a vehicle supporting vehicle motion control using torque vectoring with consideration of driver intent and load transfer according to this disclosure.
Figure 2B:
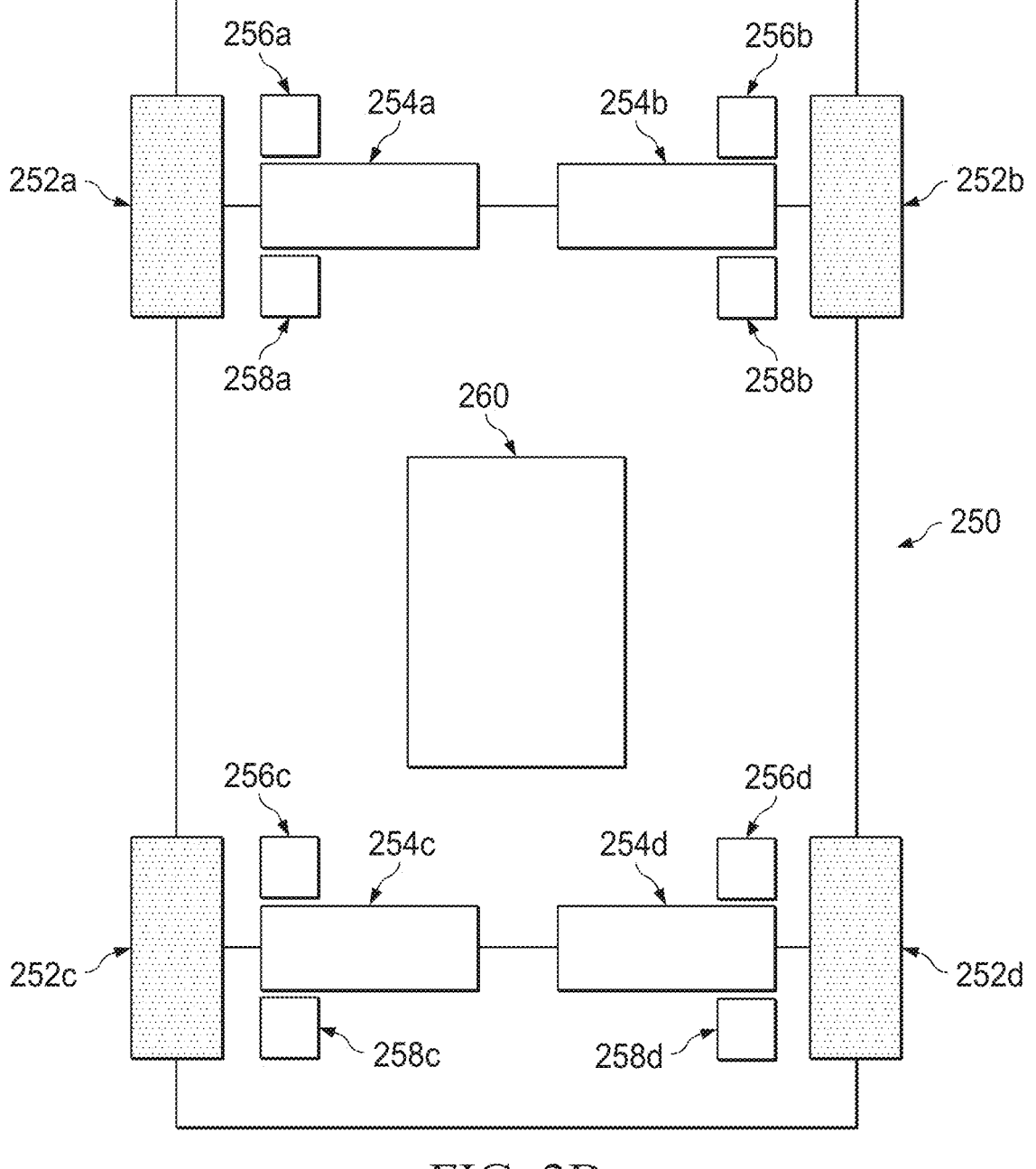

FIGS. 2A and 2B illustrate example arrangements of components in a vehicle 200, 250 supporting vehicle motion control using torque vectoring with consideration of driver intent and load transfer according to this disclosure. For ease of explanation, the vehicles 200, 250 shown in FIGS. 2A and 2B are described as representing the vehicle 100 shown in FIG. 1. However, the vehicles 200, 250 shown in FIGS. 2A and 2B may represent any other suitable vehicle implementing motion control.

As shown in FIG. 2A, the vehicle 200 includes four tires or wheels 202a-202d. Rotation of the wheels 202a-202d is produced using a motor 204a positioned in a front portion of the vehicle 200 and/or a motor 204b positioned in a rear portion of the vehicle 200. Depending on the implementation, the vehicle 200 may include the motor 204a, the motor 204b, or the motors 204a-204b. Each wheel 202a-202d may have an associated braking system 206a-206d, where each braking system 206a-206d can be used to slow the rotation of the associated wheel 202a-202d. In some cases, at least some of the wheels 202a-202d may each have an associated energy regeneration system 208a-208d, which can be used to capture energy from rotation of the associated wheel 202a-202d and use the captured energy to recharge a battery subsystem or other power source 210 of the vehicle 200.

In the vehicle 200, torque vectoring may occur in two ways. First, when at least one motor 204a or 204b is driving rotation of at least one associated pair of wheels 202a-202b or 202c-202d, the braking system 206a, 206b, 206c, 206d of one wheel can be applied to a greater extent, and the braking system 206a, 206b, 206c, 206d of another wheel can be applied to a lesser extent or not at all. For example, the braking system 206a or 206c may be applied more than the braking system 206b or 206d. Second, when at least one motor 204a or 204b is driving rotation of at least one associated pair of wheels 202a-202b or 202c-202d, the energy regeneration system 208a, 208b, 208c, 208d of one wheel can be applied to a greater extent, and the energy regeneration system 208a, 208b, 208c, 208d of another wheel can be applied to a lesser extent or not at all. For instance, the energy regeneration system 208a or 208c may be applied more than the energy regeneration system 208b or 208d. In either case, less torque is applied to the wheel 202a or 202c and more torque is applied to the wheel 202b or 202d. The result is that the vehicle 200 laterally moves to the left due to the presence of more torque along the right side of the vehicle 200. Similar operations may occur to move the vehicle 200 laterally to the right by creating more torque along the left side of the vehicle 200.

As shown in FIG. 2B, the vehicle 250 includes four tires or wheels 252a-252d. Each wheel 252a-252d may have an associated braking system 256a-256d, where each braking system 256a-256d can be used to slow the rotation of the associated wheel 252a-252d. In some cases, at least some of the wheels 252a-252d may each have an associated energy regeneration system 258a-258d, which can be used to capture energy from rotation of the associated wheel 252a-252d and use the captured energy to recharge a battery subsystem or other power source 260 of the vehicle 250. In this example, rotation of the wheels 252a-252d is produced using a pair of motors 254a-254b positioned in a front portion of the vehicle 250 and/or a pair of motors 254c-254d positioned in a rear portion of the vehicle 250. Depending on the implementation, the vehicle 250 may include the motors 254a-254b, the motors 254c-254d, or the motors 254a-254d.

In the vehicle 250, torque vectoring may occur in three ways. First, as discussed above, different braking systems 256a, 256b, 256c, 256d may be applied differently in order to create more torque along one side of the vehicle 250 and less torque along the other side of the vehicle 250. Second, as discussed above, different energy regeneration systems 258a, 258b, 258c, 258d may be applied differently in order to create more torque along one side of the vehicle 250 and less torque along the other side of the vehicle 250. Third, the motors 254a, 254b, 254c, 254d may be controlled to produce different amounts of torque on the wheels 252a, 252b, 252c, 252d, which is often referred to as "motor driving" control. For example, the motor 254a or 254c may apply more torque to the wheel 252a or 252c than the motor 254b or 254d applies to the wheel 252b or 252d. The result is that the vehicle 250 laterally moves to the right due to the presence of more torque along the left side of the vehicle 250. Similar operations may occur to move the vehicle 250 laterally to the left by creating more torque along the right side of the vehicle 250.

In this document, torque vectoring control may occur in a number of ways depending on the implementation of the specific vehicle. For example, braking system control, energy regeneration system control, or motor driving control may be used individually to cause lateral movement of a vehicle 200, 250. As another example, any suitable combination of two or more of braking system control, energy regeneration system control, and motor driving control may be used collectively to cause lateral movement of a vehicle 200, 250. Specific examples of combinations of torque vectoring techniques that may be used together include torque vectoring via braking system control and motor driving control or torque vectoring via energy regeneration system control and motor driving control.

Although FIGS. 2A and 2B illustrate examples of arrangements of components in a vehicle 200, 250 supporting vehicle motion control using torque vectoring with consideration of driver intent and load transfer, various changes may be made to FIGS. 2A and 2B. For example, various components shown in FIGS. 2A and 2B may be combined, further subdivided, replicated, omitted, or rearranged and additional functions and components may be added according to particular needs. As a particular example, a vehicle may not include one braking system and one energy regeneration system per wheel. In general, a vehicle may include any suitable number of wheels, any suitable number of braking systems, and (optionally) any suitable number of energy regeneration systems. Also, it is possible for a combination of these approaches to be used in a vehicle, such as when one motor is used in front and two motors are used in back of a vehicle (or vice versa).

Figure 3:
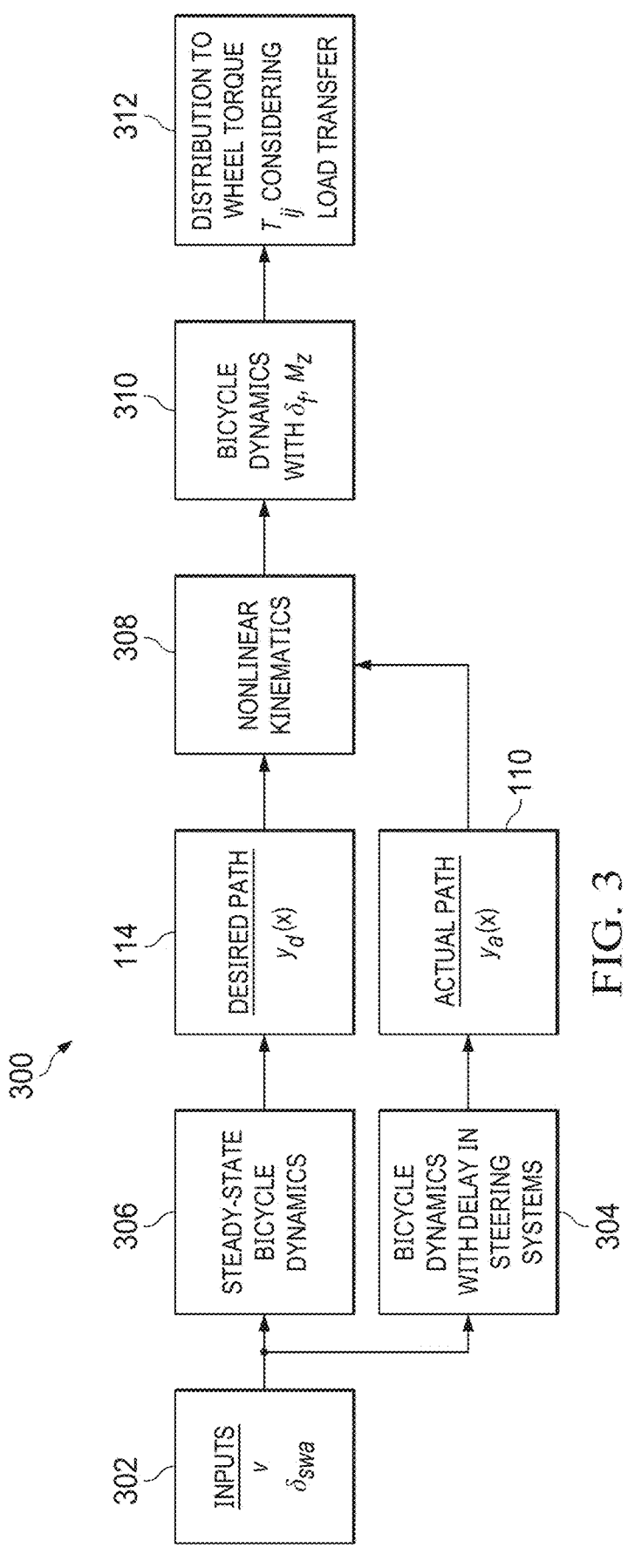
FIG. 3 illustrates an example architecture supporting vehicle motion control using torque vectoring with consideration of driver intent and load transfer according to this disclosure.

FIG. 3 illustrates an example architecture 300 supporting vehicle motion control using torque vectoring with consideration of driver intent and load transfer according to this disclosure. For ease of explanation, the architecture 300 may be described as representing a functional architecture supported or performed by the various functions 108, 112, 116 of the vehicle 100 shown in FIG. 1, where the vehicle 100 may use any suitable technique for torque vectoring (including those explained with respect to FIGS. 2A and 2B). However, the architecture 300 shown in FIG. 3 may be used with any other suitable vehicle implementing motion control, and the vehicle 100 may support any other suitable functional architecture.

As shown in FIG. 3, the architecture 300 receives various inputs 302, which in this example include a velocity (v) of the vehicle 100 and a steering wheel angle ($\delta_{swa}$) of the vehicle 100. The steering wheel angle refers to the angle to which the driver has moved a steering wheel of the vehicle 100 or otherwise allowed the steering wheel of the vehicle 100 to obtain. The inputs 302 are processed by the vehicle path prediction function 108, which in this example uses or considers bicycle dynamics 304 of the vehicle 100. The inputs 302 are also processed by the driver intent prediction function 112, which in this example uses or considers bicycle dynamics 306 of the vehicle 100. Here, the bicycle dynamics 304 consider or incorporate a delay between a steering input via the steering wheel of the vehicle 100 and an actual path change in the vehicle's path, while the bicycle dynamics 306 represent steady-state dynamics of the vehicle 100 with less or no steering dely. The two different bicycle dynamics 304 and 306 are used to respectively consider the vehicle's actual behavior and the driver's intent to identify the actual path 110 and the desired path 114. In some cases, each of the actual path 110 and the desired path 114 can identify a heading offset, a lateral offset, and a curvature of the associated path.

In some embodiments, the bicycle dynamics 304 and 306 may be defined as follows. With respect to the bicycle dynamics 306, consider a second-order polynomial that reflects the driver's desired path $y_d(x)$ as much as possible, which can be expressed as follows:

$$y_d(x_p) = d_0 + d_1 x_p + d_2 x_p^2 \tag{1}$$

where $x_p$ represents a look-ahead distance (the distance over which the driver's intent is being estimated) and where:

$$d_0 = 0 \tag{2}$$

$$d_1 = \delta_{f,cmd} \tag{3}$$

$$d_2 = \frac{1}{2}\kappa_d = \frac{1}{2}\frac{\omega_{ss}}{v} \tag{4}$$

Here, $\delta_{f,cmd}$ represents a road wheel angle command that identifies the angle that at least some of the wheels of the vehicle 100 can obtain to follow the driver's intended path. In some cases, the road wheel angle command $\delta_{f,cmd}$ can be directly converted from the driver's steering wheel angle input and map without any delay. Also, $\omega_{ss}$ represents a steady-state yaw rate that has a fast phase (relative to the measured phase). Further, $\kappa_d$ represents a desired curvature when following the driver's intended path, which can be expressed based on the vehicle's speed (v) and steady-state yaw rate ($\omega_{ss}$). Note that the desired path 114 is faster-phased than the actual path 110 since its coefficients are calculated without any delay.

The steady-state bicycle dynamics 306 for the vehicle 100 can be derived from a state-space model with a state (x) and a control input ($\delta_{f,cmd}$). In some cases, the steady-state bicycle dynamics 306 can be expressed as follows.

$$\begin{bmatrix} \dot\beta \\ \dot\omega \end{bmatrix}_{\dot x} = \underbrace{\begin{bmatrix} -\frac{2(C_r + C_f)}{mv} & \frac{2(l_r C_r - l_f C_f)}{mv^2} - 1 \\ \frac{2(l_r C_r - l_f C_f)}{I_z} & -\frac{2(l_r^2 C_r + l_f^2 C_f)}{I_z v} \end{bmatrix}}_{A_0(v)} \begin{bmatrix} \beta \\ \omega \end{bmatrix}_x + \underbrace{\begin{bmatrix} \frac{2C_f}{mv} \\ \frac{2l_f C_f}{I_z} \end{bmatrix}}_{B_0(v)} \delta_{f,cmd} \tag{5}$$

Here, the state $x=[\beta,\omega]^T$ represents a side-slip angle and a yaw rate w of the vehicle 100, m represents the vehicle's mass, $l_z$ represents the vehicle's moment of inertia with respect to the vehicle's vertical axis, $l_f$ and $l_r$ respectively represent distances from the vehicle's center of gravity to the vehicle's front and rear axles, and $C_f$ and $C_r$ respectively represent cornering stiffnesses of the front and rear wheels of the vehicle 100. Note that the cornering stiffnesses here refer to single wheels and not to a full axle. For the calculation of steady-state, if the derivative of the state x is zero, the steady-state bicycle dynamics 306 can be expressed as follows:

$$x_{ss} = -A_0^{-1} B_0 \delta_{f,cmd} \tag{6}$$

where $x_{ss}=[\beta_{ss},\omega_{ss}]^T$ represents the steady-state $\beta_{ss}$ and the steady-state yaw rate $\omega_{ss}$ of the vehicle 100. The desired curvature $\kappa_d$ can be calculated from the steady-state yaw rate $\omega ss$.

Note that with respect to the look-ahead distance $x_p$, the look-ahead distance $x_p$ can be used for both the actual path 110 and the desired path 114. In some embodiments, the look-ahead distance $x_p$ can be determined based on one or more driver inputs and one or more vehicle outputs such that the look-ahead distance $x_p$ is a function of those variables. This can be expressed as follows.

$$x_p = f(\text{driver inputs, vehicle outputs}) \tag{7}$$

Examples of driver inputs may include the steering wheel angle and one or more positions of one or more pedals (such as the acceleration pedal and/or the brake pedal). Examples of vehicle outputs may include the vehicle's speed, yaw rate, and acceleration(s) in one or more directions.

With respect to the bicycle dynamics 304, consider a second-order polynomial that reflects the actual path $y_a(x)$ of the vehicle 100 as much as possible, which can be expressed as follows:

$$y_a(x_p) = a_0 + a_1 x_p + a_2 x_p^2 \tag{8}$$

where:

$$a_0 = 0 \tag{9}$$

$$a_1 = \delta_f \tag{10}$$

$$a_2 = \frac{1}{2}\kappa_a = \frac{1}{2}\frac{\omega}{V_x} \tag{11}$$

Here, the road wheel angle ($\delta_f$) reflects a delay equivalent or similar to the actual delay of the vehicle 100, and the actual curvature ($\kappa_a$) can be derived from the yaw rate ($\omega$). The yaw rate can be found from bicycle dynamics with a first-order delay in the vehicle's steering system. In some cases, the bicycle dynamics 304 can be expressed as follows:

$$\begin{Bmatrix} \dot\beta \\ \dot\omega \\ \dot\delta_f \end{Bmatrix} = \begin{bmatrix} \frac{-2}{mV_x}(C_f + C_r) & -1 + \frac{2(-l_f C_f + l_r C_r)}{mV_x^2} & 2\frac{C_f}{mV_x} \\ \frac{2}{I_z}(-l_f C_f + l_r C_r) & \frac{-2}{I_z V_x}(l_f^2 C_f + l_r^2 C_r) & 2\frac{l_f C_f}{I_z} \\ 0 & 0 & -\frac{1}{\tau} \end{bmatrix} \tag{12}$$

$$\begin{Bmatrix} \beta \\ \omega \\ \delta_f \end{Bmatrix} + \begin{bmatrix} 0 \\ 0 \\ \frac{k}{\tau} \end{bmatrix} \delta_{swa}$$

where $\tau>0$ represents the time delay of the vehicle's steering system and $k>0$ represents a magnitude of the first-order delay steering dynamics between the road wheel angle ($\delta_f$) and the steering wheel angle ($\delta_{swa}$) such that:

$$\frac{\delta_f}{\delta_{swa}} = \frac{k}{\tau s + 1} \Longrightarrow \dot\delta_f = -\frac{k}{\tau}\delta_f + \frac{k}{\tau}\delta_{swa} \tag{13}$$

Note that the bicycle dynamics 304 might not reflect the actual behavior of the vehicle 100 at very high-rate maneuvers or in non-dry road conditions. In those or other cases, the measured yaw rate ($\omega_{meas}$) may be used for calculating the curvature of the actual path 110.

One or more differences or errors between the actual path 110 and the desired path 114 are determined by or provided to the motion control function 116, which in this example uses or considers nonlinear kinematics 308 and bicycle dynamics 310 and performs a distribution function 312. The nonlinear kinematics 308 can be associated with a coordinate system (such as Frenet coordinates), and the nonlinear kinematics 308 can be used to identify a desired yaw acceleration for the vehicle 100 based on the identified error(s). The bicycle dynamics 310 process the desired yaw acceleration to identify a desired yaw moment, which can be distributed to individual wheel torques of the vehicle 100 (while considering load transfers in the longitudinal and lateral directions) by the distribution function 312.

Figure 4:
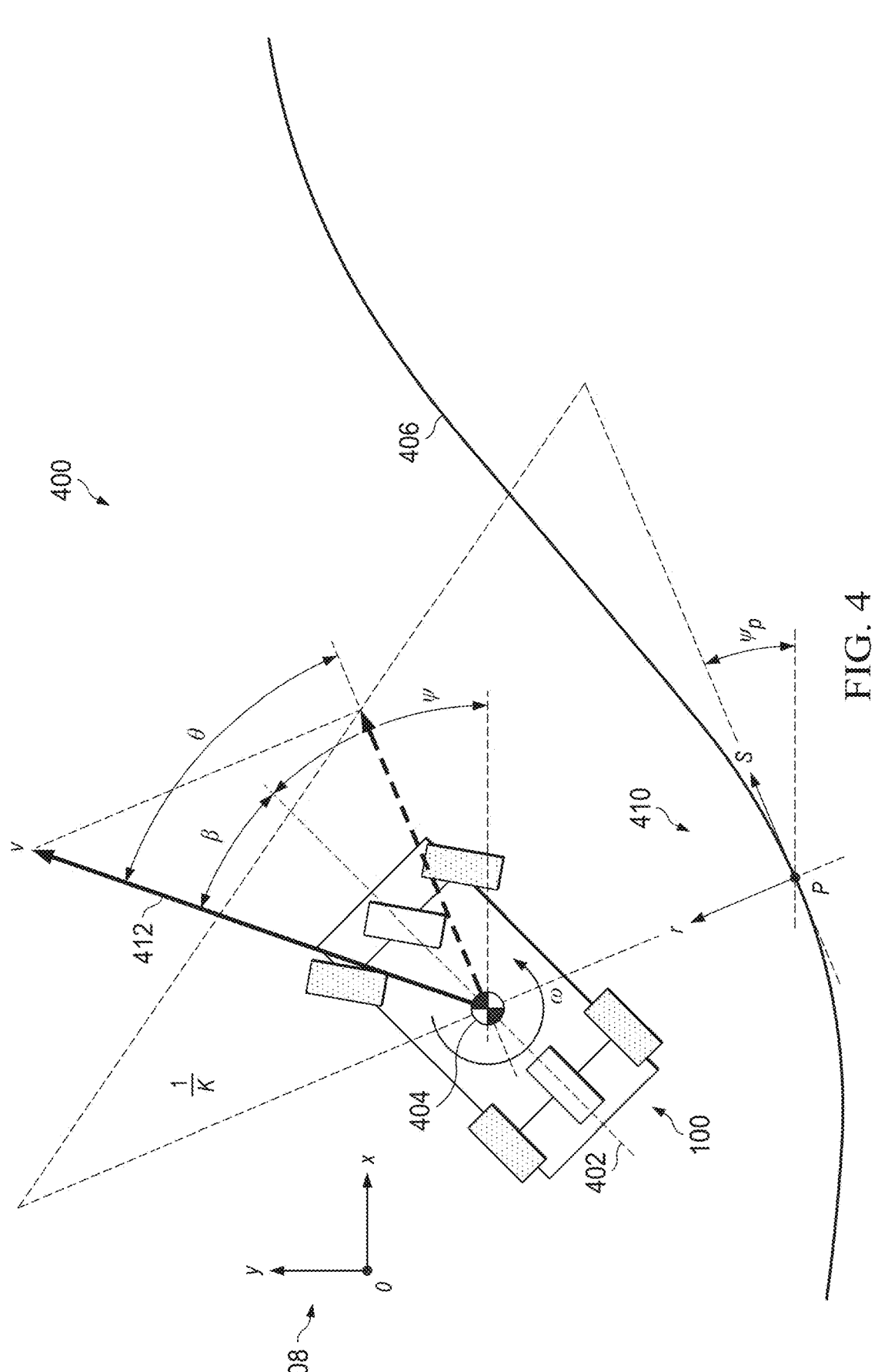
FIG. 4 illustrates example kinematics for a vehicle supporting vehicle motion control using torque vectoring with consideration of driver intent and load transfer according to this disclosure.
Figure 5:
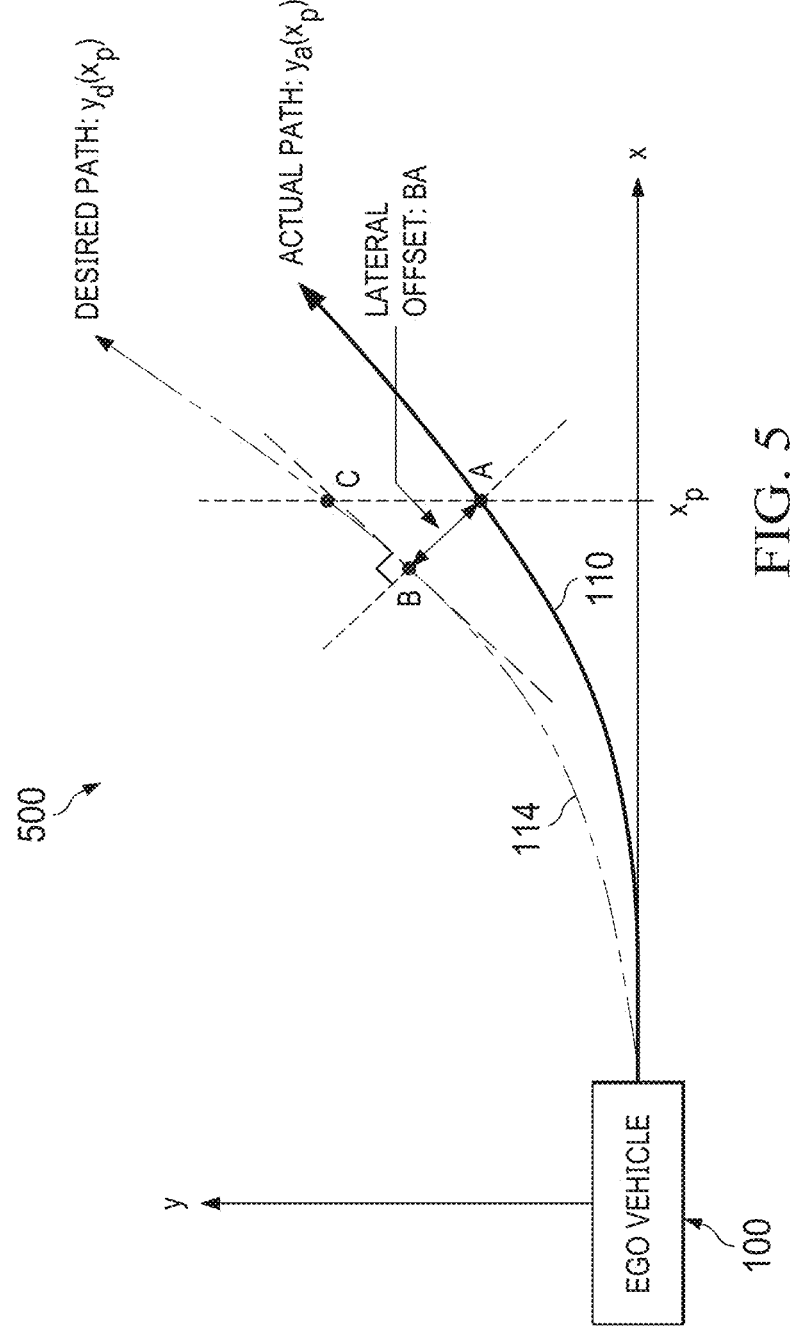
FIG. 5 illustrates an example error determination between identified paths for a vehicle supporting vehicle motion control using torque vectoring with consideration of driver intent and load transfer according to this disclosure.

Example designs and operations of the nonlinear kinematics 308 and bicycle dynamics 310 associated with the motion control function 116 are described with reference to FIGS. 4 and 5. FIG. 4 illustrates example kinematics 400 for a vehicle 100 supporting vehicle motion control using torque vectoring with consideration of driver intent and load transfer according to this disclosure. FIG. 5 illustrates an example error determination 500 between identified paths 110, 114 for a vehicle 100 supporting vehicle motion control using torque vectoring with consideration of driver intent and load transfer according to this disclosure.

As shown in FIG. 4, the vehicle 100 includes a longitudinal axis 402 and a center point 404. The longitudinal axis 402 extends through a center of the vehicle 100 along the length (as measured front-to-back) of the vehicle 100. The center point 404 represents a center of gravity or pivot point of the vehicle 100 and denotes the point about which yaw (w) can be applied to cause lateral movement (left or right movement) of the vehicle 100. The vehicle 100 here is shown as traveling along a reference path 406, which may represent the actual path 110 or the desired path 114 (although the reference path 406 may represent any other suitable path of travel for the vehicle 100). Note that while the reference path 406 is shown here as being separated from the vehicle 100 by a certain amount of space, this is done for ease of illustration only. When attempting the follow the reference path 406, the vehicle 100 may be controlled so that the center point 404 of the vehicle 100 follows the reference path 406 as closely as possible.

Two coordinate systems are also illustrated in FIG. 4. A Cartesian coordinate system 408 here defines an x-axis and a y-axis, where these two axes are orthogonal to one another. In this example, the x-axis and the y-axis are fixed, which means the axes point in the same direction regardless of the reference path 406 or the direction of travel of the vehicle 100. A vehicle-based coordinate system (such as a Frenet coordinate system) 410 here defines an r-axis and an s-axis, where these two axes are again orthogonal to one another. The s-axis is used to define the vehicle's longitudinal displacement along a road or other reference path 406, and the r-axis is used to define the vehicle's lateral displacement within the road (such as within a lane or within a collection of lanes). The axes of the vehicle-based coordinate system 410 are not fixed and can vary as the reference path 406 curves and turns.

The nonlinear kinematics 308 associated with the vehicle 100 can be based on the vehicle's coordinates within the vehicle-based coordinate system 410. For example, the center point 404 of the vehicle 100 can be projected to a point P on the reference path 406. This defines an angle $\psi_p$ between the s-axis of the vehicle-based coordinate system 410 and the x-axis of the Cartesian coordinate system 408, meaning the angle $\psi_p$ identifies an orientation of the reference path 406 at the projection point P within the Cartesian coordinate system 408. A velocity vector 412 associated with the vehicle 100 defines at least the direction of travel of the vehicle 100 at a particular instance of time. An angle $\psi$ is defined between the x-axis of the Cartesian coordinate system 408 and the longitudinal axis 402 of the vehicle 100, meaning the angle $\psi$ identifies an orientation of the vehicle's longitudinal axis 402 within the Cartesian coordinate system 408. An angle $\beta$ is defined between the longitudinal axis 402 of the vehicle 100 and the velocity vector 412, meaning the angle $\beta$ identifies the side-slip angle of the vehicle 100 (which refers to the angle between the longitudinal axis 402 of the vehicle 100 and the instantaneous direction of travel of the vehicle 100). An angle $\theta$ is defined between the s-axis of the vehicle-based coordinate system 410 and the velocity vector 412, meaning the angle $\theta$ identifies the relative course angle of the vehicle 100 within the vehicle-based coordinate system 410. A value $\kappa$ denotes a measure of the curvature of the reference path 406 at the projection point P.

By projecting a reference point (the center point 404 of the vehicle 100) onto the reference path 406 and by introducing a vehicle-based coordinate frame defined as (P, s, r) at the projection point P, the nonlinear kinematics 308 of the vehicle 100 may be described relative to the reference path 406. Any suitable projection technique may be used here to project the vehicle's reference point onto the reference path 406. One common projection technique is an orthogonal projection that defines the projection point P such that a connecting line between the center point 404 of the vehicle 100 and the projection point P is orthogonal to the tangent to the reference path 406 at the projection point P. Another common projection technique is a parallel projection that defines the projection point P by the intersection of the reference path 406 with the y-axis of the vehicle-based coordinate system 410. While the parallel projection may be easier to compute, the orthogonal projection can have certain advantages in some instances. For example, since the orthogonal projection is invariant to vehicle rotation, the projection point P monotonically travels along the reference path 406 over time (as long as the vehicle velocity remains positive). While orthogonal projection is used in the following discussion, parallel projection or any other suitable projection technique may be used here.

In some embodiments, these definitions can be used to express the full nonlinear kinematics 308 of the vehicle 100 as follows. The vehicle 100 can be said to travel exactly along the reference path 406 if the reference point P lies on the reference path 406 and the velocity vector 412 of the vehicle 100 is tangent to the reference path 406. The relative course angle $\theta$ of the vehicle 100 can therefore be expressed as $\theta=\beta+\psi-\psi_p$, since $\psi_p$ is the orientation of the reference path 406 at the projection point P. The vehicle kinematics can therefore be expressed as follows.

$$\dot{s} = \frac{v \cos(\theta)}{1 - \kappa r} \quad s(0) = s_0 \tag{14}$$

$$\dot{r} = v \sin(\theta) \quad r(0) = r_0 \tag{15}$$

-continued $$\dot{\theta} = \dot{\beta} + \omega - \frac{v\kappa \cos(\theta)}{1 - \kappa r} \quad \theta(0) = \theta_0 \tag{16}$$

The curvature $\kappa$ can be defined as the derivative of the orientation of the vehicle 100 with respect to the traveled distance along the reference path 406 and may be interpreted as the reciprocal of the local curve radius. Equation (14) here describes how fast the vehicle 100 moves along the reference path 406, and it is derived by taking the fraction of the vehicle's velocity tangent to the reference path 406 (v cos(θ)) and applying the rule of three. Equation (14) plays an important role in deriving the vehicle's dynamics but is usually ignored in lateral motion control. This illustrates one benefit of using Frenet coordinates or other vehicle-based coordinates in lateral control, namely that the number of relevant differential equations can be reduced. Equation (15) here describes how fast the vehicle 100 moves laterally, and Equation (16) here describes how fast the vehicle 100 is changing its relative course angle.

Note that there can be a relationship between (i) the error associated with the two paths 110, 114 and (ii) the inputs to the nonlinear kinematics 308. In FIG. 5, both an actual path 110 and a desired path 114 are illustrated, where $x_p$ represents the look-ahead distance, A and C respectively represent points corresponding to $x_p$ along the actual path 110 and the desired path 114, and B represents a point associated with a lateral offset using Frenet coordinates. Here, the lateral offset (r), heading offset (ψ), and curvature (κ) may be expressed as follows.

$$r = \overrightarrow{BA} \tag{17}$$

$$\psi - \psi_p = y_a'(x_p) - y_d'(B) \tag{18}$$

$$\kappa = \frac{1}{2} \cdot y_d''(B) \tag{19}$$

$$\text{where } (\cdot)' \triangleq \frac{d}{dx_p}(\cdot)$$

represents a derivative with respect to the look-ahead distance.

Motion control tasks are often simplified when describing vehicle motion in Frenet coordinates or other vehicle-based coordinates since only the lateral offset r from the s-axis may need to be regulated. To account for nonlinear vehicle kinematics, feedback linearization can be used by the motion control function 116. Feedback linearization starts by defining a controlled output z and deriving the output with respect to time until a control input u appears in the equation. For moderate curvature changes (such as those that are expected to occur on highways), path dynamics are much slower than vehicle dynamics. Thus, to simplify the design of the motion control function 116, the vehicle dynamics can be neglected here, and the side-slip angle (the fi angle) can be treated as a known time-varying parameter similar to longitudinal velocity. By defining the lateral offset of the vehicle 100 as the controlled output z, the first two derivatives of the controlled output z can be determined as follows.

$$z = r \tag{20}$$

$$\dot{z} = \dot{r} = v \sin(\theta) \tag{21}$$

-continued $$\ddot{z} = v \cos(\theta)\dot{\theta} = \tag{22}$$
$$v \cos(\theta)\left(\dot{\beta} + \omega - \frac{v\kappa \cos(\theta)}{1 - \kappa r}\right) \overset{\dot{\beta}=0}{=} v \cos(\theta)\left(\omega - \frac{v\kappa \cos(\theta)}{1 - \kappa r}\right) = \eta_1$$

Equating Equation (22) with a virtual input $\eta_i$ and solving for the yaw rate can yield a feedback linearizing control law as follows.

$$\omega_d = \underbrace{\frac{\eta_1}{v \cos(\theta)}}_{feedback} + \underbrace{\frac{v\kappa \cos(\theta)}{1 - \kappa r}}_{feedforward} \tag{23}$$

The first term in Equation (23) can be considered a feedback term based on offsets from the reference path 406, while the second term in Equation (23) can be considered a feedforward term that is dependent on the reference path's curvature. The desired yaw acceleration can be derived from one more additional derivatives of the above as follows:

$$\dddot{z} = v\cos(\theta)\big(\dot{\omega} - v^2\dot{k}\cos(\theta) + v k \sin(\theta)(\omega - v k \cos(\theta))\big) - \tag{24}$$
$$v\sin(\theta)(\omega - v k \cos(\theta))^2 = \eta_2$$

where $\dot{\omega}$ denotes the yaw acceleration and $\dot{k}$ denotes the rate of curvature. By equating Equation (24) with a virtual input $\eta_2$ and solving for $\eta_2$ to find a linearizing control law, the states of the control system can be expressed as follows:

$$\xi = \begin{bmatrix} r \\ v \sin(\theta) \\ v \cos(\theta)(\omega - v\kappa \cos(\theta)) \end{bmatrix} \tag{25}$$

$$\dot{\xi} = \begin{bmatrix} 0 & 1 & 0 \\ 0 & 0 & 1 \\ 0 & 0 & 0 \end{bmatrix} \xi + \begin{Bmatrix} 0 \\ 0 \\ 1 \end{Bmatrix} \eta_2 \tag{26}$$

The desired yaw acceleration can be determined as follows.

$$\dot{\omega}_d = -v\kappa \sin(\theta)(\omega_d - v\kappa \cos(\theta)) + \tag{27}$$
$$v\dot{k} \cos(\theta) + \frac{1}{v \cos(\theta)}\big(\eta_2 + v \sin(\theta)(\omega_d - v\kappa \cos(\theta))^2\big)$$

Thus, the nonlinear kinematics 308 may use this approach to identify the desired yaw acceleration for the vehicle 100 based on its inputs (the paths 110 and 114). The desired yaw acceleration here would help to reduce (and ideally eliminate) the error(s) between the paths 110 and 114.

The bicycle dynamics 310 use the desired yaw acceleration to identify a desired yaw moment for the vehicle 100 in order to keep the vehicle 100 traveling along the reference path 406. In some cases, the bicycle dynamics 310 can be described by a linear single-track model with states associated with the side-slip angle (the β angle) and the yaw rate (ω). Inputs to the linear single-track model can include front road wheel angle ($δ_f$) and yaw moment ($M_z$), where these inputs vary over time. The bicycle dynamics 310 in this model may be formulated with respect to the center of gravity (COG) of the vehicle 100 (the center point 404). In some cases, the bicycle dynamics 310 can be defined by a velocity-dependent state-space model as follows.

$$\begin{bmatrix} \dot{\beta} \\ \dot{\omega} \end{bmatrix}_{\dot{x}} = \underbrace{\begin{bmatrix} -\dfrac{(C_r + C_f)}{mv} & \dfrac{(l_r C_r - l_f C_f)}{mv^2} - 1 \\ \dfrac{(l_r C_r - l_f C_f)}{I_z} & -\dfrac{(l_r^2 C_r + l_f^2 C_f)}{I_z v} \end{bmatrix}}_{A(v)} \begin{bmatrix} \beta \\ \omega \end{bmatrix}_x + \underbrace{\begin{bmatrix} \dfrac{C_f}{mv} \\ \dfrac{l_f C_f}{I_z} \end{bmatrix}}_{B(v)} \delta_f + \begin{bmatrix} 0 \\ \dfrac{1}{I_z} \end{bmatrix} M_z \tag{28}$$

To avoid unmeasurable side-slip angle, measurable lateral acceleration can be used and may be expressed as follows.

$$a_y = v \cdot (\dot{\beta} + \omega) \tag{29}$$

Using a wheelbase $L = l_f + l_r$, the yaw dynamics of the vehicle 100 can be concisely expressed as follows.

$$\omega = \underbrace{\frac{C_f C_r}{C_f + C_r} \frac{L^2}{I_z v} \omega}_{f_\omega} + \underbrace{\frac{m(l_f C_f - l_r C_r)}{I_z(C_f + C_r)} a_y}_{f_a} + \underbrace{\frac{C_f C_r}{C_f + C_r} \frac{L}{I_z} \delta_f}_{f_\delta} + \frac{1}{I_z} M_z \tag{30}$$

By defining an error e between the actual yaw rate ($\omega$) and the desired yaw rate ($\omega_d$) as $e \overset{\Delta}{=} \omega - \omega_d$, the time derivative of the error can be written with the yaw acceleration above as follows.

$$\dot{e} = \dot{\omega} - \dot{\omega}_d = f_\omega \cdot \omega + f_a \cdot a_y + f_\delta \cdot \delta_f + \frac{1}{I_z} M_z - \dot{\omega}_d = \eta_e \tag{31}$$

Using the feedback linearization with a virtual input ($\eta_e = -K \cdot e$) with the positive $K > 0$, the following can be obtained.

$$\dot{e} = -K \cdot e = \eta_e \tag{32}$$

By rearranging Equation (32) about the yaw moment, the desired yaw moment for tracking the reference path 406 can be expressed and therefore calculated using the bicycle dynamics 310 as follows.

$$M_{z,d} = \tag{33}$$
$$I_z[\dot{\omega} - f_7\omega - f_a a_y - f_\delta \delta_f] = I_z[\dot{\omega}_d - K \cdot (\omega - \omega_d) - f_\omega \omega - f_a a_y - f_\delta \delta_f]$$

Note that the desired yaw rate and yaw acceleration are calculated here from the feedback linearization of full nonlinear kinematics. Also note that the desired yaw moment is calculated from the feedback linearization using the (linear) bicycle dynamics 310, and it is well known that feedback linearization is sensitive to model uncertainty. In some embodiments, model reference adaptive control (MRAC) can be used with the feedback linearization (especially for rapid maneuvers) since the bicycle dynamics 310 may not fit well with the vehicle's actual behavior. In those cases, the uncertainty and disturbance can be well-compensated by using MRAC at feedback linearization.

Once the desired yaw moment is identified, the distribution function 312 distributes the desired yaw moment to the various wheels of the vehicle 100 as wheel forces, which are converted into wheel torques via the effective dynamic radii of the wheels. This can be expressed as follows.

$$M_{z,d} = (-F_{left} + F_{right}) \cdot \frac{L_w}{2} \tag{34}$$

Here, $F_{left} = F_{FL} + F_{RL}$ represents the sum of desired tire forces on the left side of the vehicle 100, which is based on a force at the left front wheel, $F_{FL}$, and a force at the left rear wheel, $F_{RL}$. Also, $F_{right} = F_{FR} + F_{RR}$ represents the sum of desired tire forces on the right side of the vehicle 100, which is based on a force at the right front wheel, $F_{FR}$, and a force at the right rear wheel, $F_{RR}$. In addition, $L_w$ represents the length between left and right wheels along the same axle of the vehicle 100. The sum of forces equals the total wheel force, which can be expressed as follows.

$$F_{total} = F_{left} + F_{right} \tag{35}$$

In some cases, the total force $F_{total}$ can be defined based on one or more driver inputs, such as the current positions of the acceleration and braking pedals (which are controlled by the driver).

With two constraints of moment and force, the forces on the left and right sides of the vehicle 100 can be determined, and the distribution of the forces to the front and rear portions of the vehicle 100 can be identified according to the acceleration from the total force. In some embodiments, this can be expressed as follows.

$$\begin{cases} F_{FL} = \alpha_L \cdot F_{left} \\ F_{RL} = (1 - \alpha_L) \cdot F_{left} \end{cases} \tag{36}$$

$$\begin{cases} F_{FR} = \alpha_L \cdot F_{right} \\ F_{RR} = (1 - \alpha_L) \cdot F_{right} \end{cases} \tag{37}$$

Here, $\alpha_L$ and $\alpha_R$ are related to load transfers that occur in longitudinal and lateral directions and affect vertical tire forces (normal forces that are perpendicular to the ground). The normal force at each tire can be expressed based on both longitudinal acceleration and lateral acceleration, such as in the following manner.

$$F_{z,FL} = F_{z0,FL} - k_x a_x - k_y a_y \tag{38}$$

$$F_{z,FR} = F_{z0,FR} - k_x a_x + k_y a_y \tag{39}$$

$$F_{z,RL} = F_{z0,RL} + k_x a_x - k_y a_y \tag{40}$$

$$F_{z,RR} = F_{z0,RR} + k_x a_x + k_y a_y \tag{41}$$

Here, $F_{z,ij}$ represents the nominal force at each tire. Also, $F_{z0,ij}$ represents static normal loads at ij=FL, FR, RL, RR. In addition, $k_x, k_y > 0$ respectively represent parameters for longitudinal and lateral accelerations ($a_x$, $a_y$). From the friction constraint at each tire, the range of longitudinal tire forces can be determined and may be expressed as follows:

$$\sqrt{F_{x,ij}^2 + F_{y,ij}^2} \le \mu \cdot F_{z,ij} \rightarrow |F_{x,ij}| \le \sqrt{(\mu \cdot F_{z,ij})^2 - F_{y,ij}^2} \qquad (42)$$

where $F_{x,ij}$ and $F_{y,ij}$ respectively represent longitudinal and lateral tire forces and $\mu$ represents a road friction coefficient. Based on the ratio of normal tire forces and the availability of each longitudinal tire force, the distribution factors $\alpha_L$ and $\alpha_R$ may be determined as follows.

$$\alpha_L = \frac{F_{z,FL}}{F_{z,FL} + F_{z,RL}} \qquad (43)$$

$$\alpha_R = \frac{F_{z,FR}}{F_{z,FR} + F_{z,RR}} \qquad (44)$$

This allows the distribution function 312 to consider load transfers and ensure that at least some minimum tire friction is present on all wheels of the vehicle 100 during a maneuver (which helps to ensure safe operation of the vehicle 100).

Figure 6:
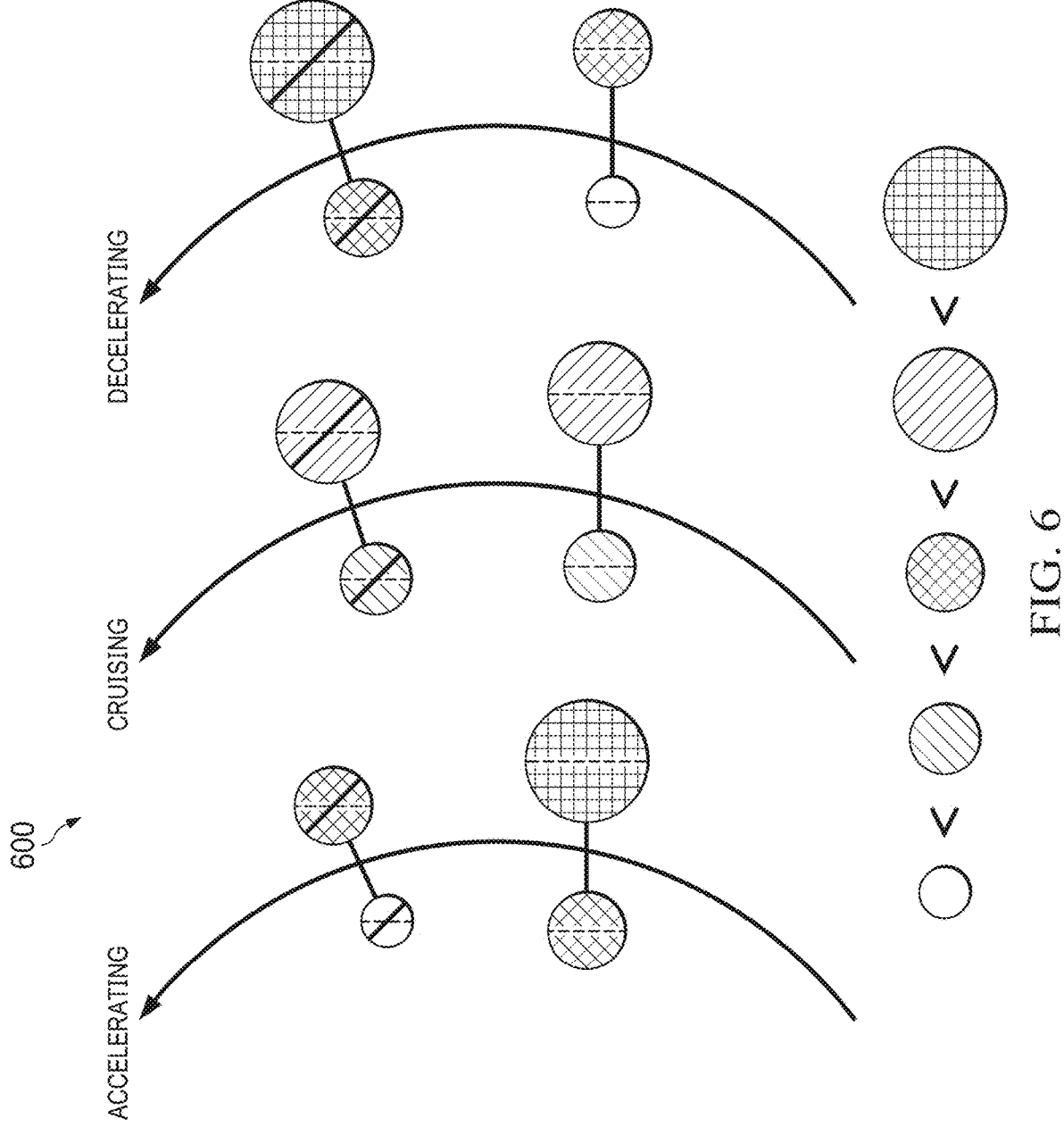
FIG. 6 illustrates example normal force changes due to load transfer in a vehicle supporting vehicle motion control using torque vectoring with consideration of driver intent and load transfer according to this disclosure.

FIG. 6 illustrates example normal force changes 600 due to load transfer in a vehicle 100 supporting vehicle motion control using torque vectoring with consideration of driver intent and load transfer according to this disclosure. More specifically, FIG. 6 illustrates how a load transfer may occur when a vehicle 100 is turning (in this case to the left) while accelerating, cruising, and decelerating. Each of the accelerating, cruising, and decelerating scenarios is associated with four circles that represent the tire frictions on associated wheels of the vehicle 100. Various circles have different sizes, and the different sizes of the circles are used to represent different amounts of tire frictions on the associated wheels of the vehicle 100.

As can be seen here, accelerating while turning (again to the left in this example) transfers load from the rear inner side of the vehicle 100 to the front outer side of the vehicle 100. The inner side of the vehicle faces the turning direction, and the outer side of the vehicle faces away from the turning direction. Cruising while turning transfers load from the rear of the vehicle 100 to the front of the vehicle 100. Decelerating while turning transfers load from the rear outer side of the vehicle 100 to the front inner side of the vehicle 100. Thus, the distribution function 312 can use the acceleration/cruising/deceleration status of the vehicle 100 when determining how to distribute the yaw moment so that each tire of the vehicle 100 maintains at least a minimum amount of tire friction with the ground.

Once the desired tire forces are determined, the desired tire forces can be converted to wheel torques, such as in the following manner.

$$T_{ij} = r_{eff} \cdot F_{ij} \qquad (45)$$

Here, $r_{eff}$ is the effective dynamic radius of a wheel. Note that the wheel torques can be also calculated from the longitudinal tire forces through wheel dynamics. However determined, the distribution function 312 here is able to distribute the desired yaw moment to the different wheels of the vehicle 100.

Although FIG. 3 illustrates one example of an architecture 300 supporting vehicle motion control using torque vectoring with consideration of driver intent and load transfer, various changes may be made to FIG. 3. For example, various dynamics of the vehicle 100 may be expressed in any other suitable manner, and any other suitable technique may be used to distribute a yaw moment to wheels of the vehicle 100. Although FIGS. 4 through 6 illustrate one of example of kinematics, one example of an error determination between identified paths, and one example of normal force changes due to load transfer for a vehicle 100 supporting vehicle motion control, various changes may be made to FIGS. 4 through 6. For instance, the path and coordinate systems shown in FIG. 4, the paths shown in FIG. 5, and the tire force transfers shown in FIG. 6 are for illustration only and can vary, such as based on the current environment and the current operation of the vehicle 100.

FIG. 7 illustrates an example method 700 for vehicle motion control using torque vectoring with consideration of driver intent and load transfer according to this disclosure. For ease of explanation, the method 700 shown in FIG. 7 is described as being performed by the vehicle 100 shown in FIG. 1, which may include or represent one of the vehicles 200, 250 shown in FIGS. 2A and 2B and which may support the architecture 300 shown in FIG. 3. However, the method 700 shown in FIG. 7 may be performed using any other suitable vehicle having any other suitable architecture.

As shown in FIG. 7, input data associated with a vehicle is obtained at step 702. This may include, for example, the processor 102 of the vehicle 100 obtaining data from one or more IMUs 104a or other sensors 104 and/or data from one or more components coupled to the bus 106. In some embodiments, the input data may include driver inputs and vehicle outputs, such as a driver-selected steering wheel angle, one or more driver-selected positions of one or more pedals (such as the acceleration pedal and/or the brake pedal), the vehicle's speed, the vehicle's yaw rate, and the vehicle's acceleration(s) in one or more directions. Actual and desired paths for the vehicle are identified at step 704. This may include, for example, the processor 102 generating second-order polynomials or other polynomials identifying the actual path 110 to be followed by the vehicle 100 based on its current operation and the desired path 114 that the driver is estimated to want the vehicle 100 to follow. In some embodiments, the actual path 110 may be identified using the bicycle dynamics 304 (which incorporate a steering system delay), and the desired path 114 may be identified using the bicycle dynamics 306 (which do not incorporate a steering system delay).

One or more errors between the actual and desired paths of the vehicle are identified at step 706. This may include, for example, the processor 102 identifying a lateral offset between points on the actual and desired paths 110, 114 at a specified look-ahead distance. A yaw acceleration and a yaw moment needed to at least partially correct for the identified error(s) are determined at step 708. This may include, for example, the processor 102 identifying the yaw acceleration that would be needed in order to reduce or eliminate the identified error(s) between the actual path 110 and the desired path 114. This may also include the processor 102 identifying the desired yaw moment that would provide the identified yaw acceleration. In some embodiments, the yaw acceleration may be identified using the nonlinear kinematics 308, and the yaw moment may be identified using the bicycle dynamics 310.

The yaw moment is distributed to the wheels of the vehicle while considering the vehicle's load transfer at step 710. This may include, for example, the processor 102 determining how to distribute the desired yaw moment to the various wheels of the vehicle 100 as wheel forces, which are then converted into wheel torques and provide torque vectoring for the vehicle 100. This may also include the processor 102 considering how loads on the wheels of the vehicle 100 may vary during a maneuver, such as by considering how loads may be transferred between wheels of the vehicle 100 if a turn is made while accelerating, cruising, or decelerating. This may further include the processor 102 ensuring that a minimum wheel force remains on each wheel of the vehicle 100 during the maneuver, where the yaw moment is distributed to maintain at least this minimum wheel force on each wheel of the vehicle 100. The vehicle is moved to follow the desired path more closely based on the distributed yaw moment at step 712. This may include, for example, the vehicle 100 moving laterally to the left or right based on which side of the vehicle 100 has wheels providing more torque and which side of the vehicle 100 has wheels providing less torque. Ideally, this allows the vehicle 100 to more closely follow the driver's desired path 114 while maintaining suitable wheel forces on the wheels of the vehicle 100.

Although FIG. 7 illustrates one example of a method 700 for vehicle motion control using torque vectoring with consideration of driver intent and load transfer, various changes may be made to FIG. 7. For example, while shown as a series of steps, various steps in FIG. 7 may overlap, occur in parallel, occur in a different order, or occur any number of times. As a particular example, the steps of FIG. 7 may be repeatedly performed in an overlapping manner so that a current lateral movement of the vehicle 100 can be determined and implemented while additional data is being received and processed to determine a future lateral movement of the vehicle 100.

Note that many functional aspects of the embodiments described above can be implemented using any suitable hardware or any suitable combination of hardware and software/firmware instructions. In some embodiments, at least some functional aspects of the embodiments described above can be embodied as software instructions that are executed by one or more unitary or multi-core central processing units or other processing device(s). In other embodiments, at least some functional aspects of the embodiments described above can be embodied using one or more application specific integrated circuits (ASICs) When implemented using one or more ASICs, any suitable integrated circuit design and manufacturing techniques may be used, such as those that can be automated using electronic design automation (EDA) tools. Examples of such tools include tools provided by SYNOPSYS, INC., CADENCE DESIGN SYSTEMS, INC., and SIEMENS EDA.

Figures 8, 9:
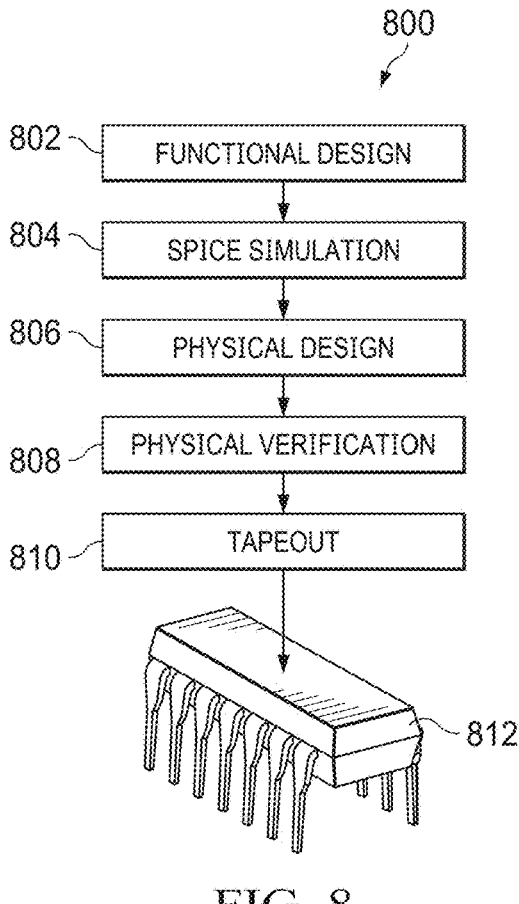
FIG. 8 illustrates an example design flow for employing one or more tools to design hardware that implements one or more control functions according to this disclosure.
FIG. 9 illustrates an example device supporting execution of one or more tools to design hardware that implements one or more control functions according to this disclosure.

FIG. 8 illustrates an example design flow 800 for employing one or more tools to design hardware that implements one or more control functions according to this disclosure. More specifically, the design flow 800 here represents a simplified ASIC design flow employing one or more EDA tools or other tools for designing and facilitating fabrication of ASICs that implement at least some functional aspects of the various embodiments described above.

As shown in FIG. 8, a functional design of an ASIC is created at step 802. For any portion of the ASIC design that is digital in nature, in some cases, this may include expressing the digital functional design by generating register transfer level (RTL) code in a hardware descriptive language (HDL), such as VHDL or VERILOG. A functional verification (such as a behavioral simulation) can be performed on HDL data structures to ensure that the RTL code that has been generated is in accordance with logic specifications. In other cases, a schematic of digital logic can be captured and used, such as through the use of a schematic capture program. For any portion of the ASIC design that is analog in nature, this may include expressing the analog functional design by generating a schematic, such as through the use of a schematic capture program. The output of the schematic capture program can be converted (synthesized), such as into gate/transistor level netlist data structures. Data structures or other aspects of the functional design are simulated, such as by using a simulation program with integrated circuits emphasis (SPICE), at step 804. This may include, for example, using the SPICE simulations or other simulations to verify that the functional design of the ASIC performs as expected.

A physical design of the ASIC is created based on the validated data structures and other aspects of the functional design at step 806. This may include, for example, instantiating the validated data structures with their geometric representations. In some embodiments, creating a physical layout includes "floor-planning," where gross regions of an integrated circuit chip are assigned and input/output (I/O) pins are defined. Also, hard cores (such as arrays, analog blocks, inductors, etc.) can be placed within the gross regions based on design constraints (such as trace lengths, timing, etc.). Clock wiring, which is commonly referred to or implemented as clock trees, can be placed within the integrated circuit chip, and connections between gates/analog blocks can be routed within the integrated circuit chip. When all elements have been placed, a global and detailed routing can be performed to connect all of the elements together. Post-wiring optimization may be performed to improve performance (such as timing closure), noise (such as signal integrity), and yield. The physical layout can also be modified where possible while maintaining compliance with design rules that are set by a captive, external, or other semiconductor manufacturing foundry of choice, which can make the ASIC more efficient to produce in bulk. Example modifications may include adding extra vias or dummy metal/diffusion/poly layers.

The physical design is verified at step 808. This may include, for example, performing design rule checking (DRC) to determine whether the physical layout of the ASIC satisfies a series of recommended parameters, such as design rules of the foundry. In some cases, the design rules represent a series of parameters provided by the foundry that are specific to a particular semiconductor manufacturing process. As particular examples, the design rules may specify certain geometric and connectivity restrictions to ensure sufficient margins to account for variability in semiconductor manufacturing processes or to ensure that the ASICs work correctly. Also, in some cases, a layout versus schematic (LVS) check can be performed to verify that the physical layout corresponds to the original schematic or circuit diagram of the design. In addition, a complete simulation may be performed to ensure that the physical layout phase is properly done.

After the physical layout is verified, mask generation design data is generated at step 810. This may include, for example, generating mask generation design data for use in creating photomasks to be used during ASIC fabrication. The mask generation design data may have any suitable form, such as GDSII data structures. This step may be said to represent a "tape-out" for preparation of the photomasks. The GDSII data structures or other mask generation design data can be transferred through a communications medium (such as via a storage device or over a network) from a circuit designer or other party to a photomask supplier/maker or to the semiconductor foundry itself. The photomasks can be created and used to fabricate ASIC devices at step 812.

Although FIG. 8 illustrates one example of a design flow 800 for employing one or more tools to design hardware that implements one or more vehicle control functions, various changes may be made to FIG. 8. For example, at least some functional aspects of the various embodiments described above may be implemented in any other suitable manner.

FIG. 9 illustrates an example device 900 supporting execution of one or more tools to design hardware that implements one or more vehicle control functions according to this disclosure. The device 900 may, for example, be used to implement at least part of the design flow 800 shown in FIG. 8. However, the design flow 800 may be implemented in any other suitable manner.

As shown in FIG. 9, the device 900 denotes a computing device or system that includes at least one processing device 902, at least one storage device 904, at least one communications unit 906, and at least one input/output (I/O) unit 908. The processing device 902 may execute instructions that can be loaded into a memory 910. The processing device 902 includes any suitable number(s) and type(s) of processors or other processing devices in any suitable arrangement. Example types of processing devices 902 include one or more microprocessors, microcontrollers, digital signal processors (DSPs), application specific integrated circuits (ASICs), field programmable gate arrays (FPGAs), or discrete circuitry.

The memory 910 and a persistent storage 912 are examples of storage devices 904, which represent any structure(s) capable of storing and facilitating retrieval of information (such as data, program code, and/or other suitable information on a temporary or permanent basis). The memory 910 may represent a random access memory or any other suitable volatile or non-volatile storage device(s). The persistent storage 912 may contain one or more components or devices supporting longer-term storage of data, such as a read only memory, hard drive, Flash memory, or optical disc.

The communications unit 906 supports communications with other systems or devices. For example, the communications unit 906 can include a network interface card or a wireless transceiver facilitating communications over a wired or wireless network. The communications unit 906 may support communications through any suitable physical or wireless communication link(s).

The I/O unit 908 allows for input and output of data. For example, the I/O unit 908 may provide a connection for user input through a keyboard, mouse, keypad, touchscreen, or other suitable input device. The I/O unit 908 may also send output to a display or other suitable output device. Note, however, that the I/O unit 908 may be omitted if the device 900 does not require local I/O, such as when the device 900 represents a server or other device that can be accessed remotely.

The instructions that are executed by the processing device 902 include instructions that implement at least part of the design flow 800. For example, the instructions that are executed by the processing device 902 may cause the processing device 902 to generate or otherwise obtain functional designs, perform simulations, generate physical designs, verify physical designs, perform tape-outs, or create/use photomasks (or any combination of these functions). As a result, the instructions that are executed by the processing device 902 support the design and fabrication of ASIC devices or other devices that implement one or more vehicle control functions described above.

Although FIG. 9 illustrates one example of a device 900 supporting execution of one or more tools to design hardware that implements one or more vehicle control functions, various changes may be made to FIG. 9. For example, computing and communication devices and systems come in a wide variety of configurations, and FIG. 9 does not limit this disclosure to any particular computing or communication device or system.

In some embodiments, various functions described in this patent document are implemented or supported using machine-readable instructions that are stored on a non-transitory machine-readable medium. The phrase "machine-readable instructions" includes any type of instructions, including source code, object code, and executable code. The phrase "non-transitory machine-readable medium" includes any type of medium capable of being accessed by one or more processing devices or other devices, such as a read only memory (ROM), a random access memory (RAM), a Flash memory, a hard disk drive (HDD), or any other type of memory. A "non-transitory" medium excludes wired, wireless, optical, or other communication links that transport transitory electrical or other signals. Non-transitory media include media where data can be permanently stored and media where data can be stored and later overwritten.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:

operating at least one processing device of a vehicle for identifying an actual path and a desired path for a vehicle, the actual path representing an expected path for the vehicle based on current operation of the vehicle, the desired path representing an estimated path that a driver of the vehicle wants to follow;

identifying one or more errors between the actual path and the desired path;

determining how to apply torque vectoring to cause the vehicle to more closely follow the desired path based on the one or more errors by identifying a yaw moment for the vehicle about a vertical axis of the vehicle and using a distribution function to distribute the yaw moment to different wheels of the vehicle; and applying the torque vectoring to create lateral movement of the vehicle during travel.

2. The method of claim 1, wherein determining how to apply the torque vectoring comprises:

identifying a yaw acceleration to cause lateral movement of the vehicle in order to at least partially reduce the one or more errors; and identifying the yaw moment for the vehicle based on the yaw acceleration.

3. The method of claim 2, wherein determining how to distribute the yaw moment to the different wheels of the vehicle comprises:

estimating how load transfer occurs between the different wheels of the vehicle during a maneuver; and determining wheel forces for the wheels of the vehicle such that each wheel of the vehicle maintains a minimum wheel force during the maneuver.

4. The method of claim 3, wherein the load transfer varies depending on whether the maneuver involves the vehicle accelerating, cruising, or decelerating during a turn of the vehicle.

5. The method of claim 3, wherein:

estimating how the load transfer occurs comprises identifying distribution factors based on longitudinal and lateral accelerations of the vehicle; and the wheel forces for the wheels are determined using the distribution factors.

6. The method of claim 2, wherein:

identifying the actual path of the vehicle comprises using first bicycle dynamics of the vehicle, the first bicycle dynamics incorporating a steering system delay associated with the vehicle;

identifying the desired path of the vehicle comprises using second bicycle dynamics of the vehicle, the second bicycle dynamics not incorporating the steering system delay;

identifying the yaw acceleration comprises using nonlinear kinematics of the vehicle; and identifying the yaw moment comprises using third bicycle dynamics of the vehicle.

7. The method of claim 2, wherein:

each wheel of the vehicle is configured to convert a portion of the yaw moment into a corresponding wheel torque; and at least some of the wheel torques are different to create the lateral movement of the vehicle.

8. An apparatus comprising:

at least one processing device configured to:

identify an actual path and a desired path for a vehicle, the actual path representing an expected path for the vehicle based on current operation of the vehicle, the desired path representing an estimated path that a driver of the vehicle wants to follow;

identify one or more errors between the actual path and the desired path;

determine how to apply torque vectoring to cause the vehicle to more closely follow the desired path based on the one or more errors by identifying a yaw moment for the vehicle about a vertical axis of the vehicle and using a distribution function to distribute the yaw moment to different wheels of the vehicle; and apply the torque vectoring to create lateral movement of the vehicle during travel.

9. The apparatus of claim 8, wherein, to determine how to apply the torque vectoring, the at least one processing device is configured to:

identify a yaw acceleration to cause lateral movement of the vehicle in order to at least partially reduce the one or more errors; and identify the yaw moment for the vehicle based on the yaw acceleration.

10. The apparatus of claim 9, wherein, to determine how to distribute the yaw moment to the different wheels of the vehicle, the at least one processing device is configured to:

estimate how load transfer occurs between the different wheels of the vehicle during a maneuver; and determine wheel forces for the wheels of the vehicle such that each wheel of the vehicle maintains a minimum wheel force during the maneuver.

11. The apparatus of claim 10, wherein the load transfer varies depending on whether the maneuver involves the vehicle accelerating, cruising, or decelerating during a turn of the vehicle.

12. The apparatus of claim 10, wherein:

to estimate how the load transfer occurs, the at least one processing device is configured to identify distribution factors based on longitudinal and lateral accelerations of the vehicle; and the at least one processing device is configured to determine the wheel forces for the wheels using the distribution factors.

13. The apparatus of claim 9, wherein:

to identify the actual path of the vehicle, the at least one processing device is configured to use first bicycle dynamics of the vehicle, the first bicycle dynamics incorporating a steering system delay associated with the vehicle;

to identify the desired path of the vehicle, the at least one processing device is configured to use second bicycle dynamics of the vehicle, the second bicycle dynamics not incorporating the steering system delay;

to identify the yaw acceleration, the at least one processing device is configured to use nonlinear kinematics of the vehicle; and to identify the yaw moment, the at least one processing device is configured to use third bicycle dynamics of the vehicle.

14. The apparatus of claim 9, wherein:

each wheel of the vehicle is configured to convert a portion of the yaw moment into a corresponding wheel torque; and the at least one processing device is configured to distribute the yaw moment such that at least some of the wheel torques are different to create the lateral movement of the vehicle.

15. A non-transitory machine-readable medium containing instructions that when executed cause at least one processor to:

identify an actual path and a desired path for a vehicle, the actual path representing an expected path for the vehicle based on current operation of the vehicle, the desired path representing an estimated path that a driver of the vehicle wants to follow;

identify one or more errors between the actual path and the desired path;

determine how to apply torque vectoring to cause the vehicle to more closely follow the desired path based on the one or more errors by identifying a yaw moment for the vehicle about a vertical axis of the vehicle and using a distribution function to distribute the yaw moment to different wheels of the vehicle; and apply the torque vectoring to create lateral movement of the vehicle during travel.

16. The non-transitory machine-readable medium of claim 15, wherein the instructions that when executed cause the at least one processor to determine how to apply the torque vectoring comprise instructions that when executed cause the at least one processor to:

identify a yaw acceleration to cause lateral movement of the vehicle in order to at least partially reduce the one or more errors; and identify the yaw moment for the vehicle based on the yaw acceleration.

17. The non-transitory machine-readable medium of claim 16, wherein the instructions that when executed cause the at least one processor to determine how to distribute the yaw moment to the different wheels of the vehicle comprise instructions that when executed cause the at least one processor to:

estimate how load transfer occurs between the different wheels of the vehicle during a maneuver; and determine wheel forces for the wheels of the vehicle such that each wheel of the vehicle maintains a minimum wheel force during the maneuver.

18. The non-transitory machine-readable medium of claim 17, wherein the load transfer varies depending on whether the maneuver involves the vehicle accelerating, cruising, or decelerating during a turn of the vehicle.

19. The non-transitory machine-readable medium of claim 17, wherein:

the instructions that when executed cause the at least one processor to estimate how the load transfer occurs comprise instructions that when executed cause the at least one processor to identify distribution factors based on longitudinal and lateral accelerations of the vehicle; and the instructions when executed cause the at least one processor to determine the wheel forces for the wheels using the distribution factors.

20. The non-transitory machine-readable medium of claim 16, wherein:

the instructions that when executed cause the at least one processor to identify the actual path of the vehicle comprise instructions that when executed cause the at least one processor to use first bicycle dynamics of the vehicle, the first bicycle dynamics incorporating a steering system delay associated with the vehicle;

the instructions that when executed cause the at least one processor to identify the desired path of the vehicle comprise instructions that when executed cause the at least one processor to use second bicycle dynamics of the vehicle, the second bicycle dynamics not incorporating the steering system delay;

the instructions that when executed cause the at least one processor to identify the yaw acceleration comprise instructions that when executed cause the at least one processor to use nonlinear kinematics of the vehicle; and the instructions that when executed cause the at least one processor to identify the yaw moment comprise instructions that when executed cause the at least one processor to use third bicycle dynamics of the vehicle.

21. The non-transitory machine-readable medium of claim 16, wherein:

each wheel of the vehicle is configured to convert a portion of the yaw moment into a corresponding wheel torque; and the instructions when executed cause the at least one processor to distribute the yaw moment such that at least some of the wheel torques are different to create the lateral movement of the vehicle.

* * * * *